United States Patent
Kadu et al.

(10) Patent No.: US 11,838,531 B2
(45) Date of Patent: Dec. 5, 2023

(54) CASCADE PREDICTION

(71) Applicant: Dolby Laboratories Licensing Corporation, San Francisco, CA (US)

(72) Inventors: Harshad Kadu, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/781,165

(22) PCT Filed: Dec. 3, 2020

(86) PCT No.: PCT/US2020/063165
§ 371 (c)(1),
(2) Date: May 31, 2022

(87) PCT Pub. No.: WO2021/113549
PCT Pub. Date: Jun. 10, 2021

(65) Prior Publication Data
US 2023/0007294 A1     Jan. 5, 2023

Related U.S. Application Data

(60) Provisional application No. 62/944,636, filed on Dec. 6, 2019.

(30) Foreign Application Priority Data

Dec. 6, 2019 (EP) .................... 19214124

(51) Int. Cl.
*H04N 19/50* (2014.01)
*H04N 19/186* (2014.01)
*H04N 19/169* (2014.01)

(52) U.S. Cl.
CPC .......... *H04N 19/50* (2014.11); *H04N 19/186* (2014.11); *H04N 19/1887* (2014.11)

(58) Field of Classification Search
CPC .. H04N 19/109; H04N 19/136; H04N 19/184; H04N 19/186; H04N 19/1887;
(Continued)

(56) References Cited

U.S. PATENT DOCUMENTS

| 8,811,490 B2 | 8/2014 | Su |
| 9,386,313 B2 | 7/2016 | Su |

(Continued)

FOREIGN PATENT DOCUMENTS

| EP | 2214415 B1 | 6/2018 |
| JP | 2009524371 A | 6/2009 |

(Continued)

OTHER PUBLICATIONS

ITU Rec. ITU-R BT. 1886, "Reference electro-optical transfer function for flat panel displays used in HDTV studio production," (Mar. 2011).

(Continued)

*Primary Examiner* — Mohammed S Rahaman

(57) ABSTRACT

A first predictor is applied to an input image to generate first-stage predicted codewords approximating prediction target codewords of a prediction target image. Second-stage prediction target values are created by performing an inverse cascade operation on the prediction target codewords and the first-stage predicted codewords. A second predictor is applied to the input image to generate second-stage predicted values approximating the second-stage prediction target values. Multiple sets of cascade prediction coefficients are generated to comprise first and second sets of cascade prediction coefficients specifying the first and second predictors. The multiple sets of cascade prediction coefficients (Continued)

are encoded, in a video signal, as image metadata. The video signal is further encoded with the input image.

13 Claims, 9 Drawing Sheets

(58) Field of Classification Search
CPC ...... H04N 19/30; H04N 19/46; H04N 19/467; H04N 19/50
See application file for complete search history.

(56) References Cited

U.S. PATENT DOCUMENTS

| | | | |
|---|---|---|---|
| 2004/0190624 A1* | 9/2004 | Kondo | H04N 19/56 348/E7.015 |
| 2010/0172411 A1* | 7/2010 | Efremov | H04N 19/136 375/E7.076 |
| 2010/0310184 A1* | 12/2010 | Yu | H04N 19/172 382/238 |
| 2015/0365688 A1* | 12/2015 | Su | H04N 19/40 375/240.03 |
| 2017/0180734 A1* | 6/2017 | Su | H04N 19/52 |
| 2018/0007356 A1 | 1/2018 | Kadu | |
| 2018/0020224 A1 | 1/2018 | Su | |
| 2018/0098094 A1 | 4/2018 | Wen | |
| 2019/0011054 A1 | 1/2019 | Knipper | |

FOREIGN PATENT DOCUMENTS

| | | |
|---|---|---|
| WO | 2007082562 A2 | 7/2007 |
| WO | 2017019818 A1 | 2/2017 |
| WO | 2017024042 A2 | 2/2017 |
| WO | 2017121549 A1 | 7/2017 |
| WO | 2021067204 A1 | 4/2021 |

OTHER PUBLICATIONS

ITU-R BT. 2100-0 "Image parameter values for high dynamic range television for use in production and international programme exchange" Jul. 2016.

Kim Byung-Gyu, et al "A Novel Hybrid 3D Video Service Algorithm Based on Scalable video Coding, (SVC) Technology" Displays Devices, vol. 40, Jun. 3, 2015, pp. 45-52.

SMPTE ST 2084:2014 "High Dynamic Range EOTF of Mastering Reference Displays" (hereinafter "SMPTE").

* cited by examiner

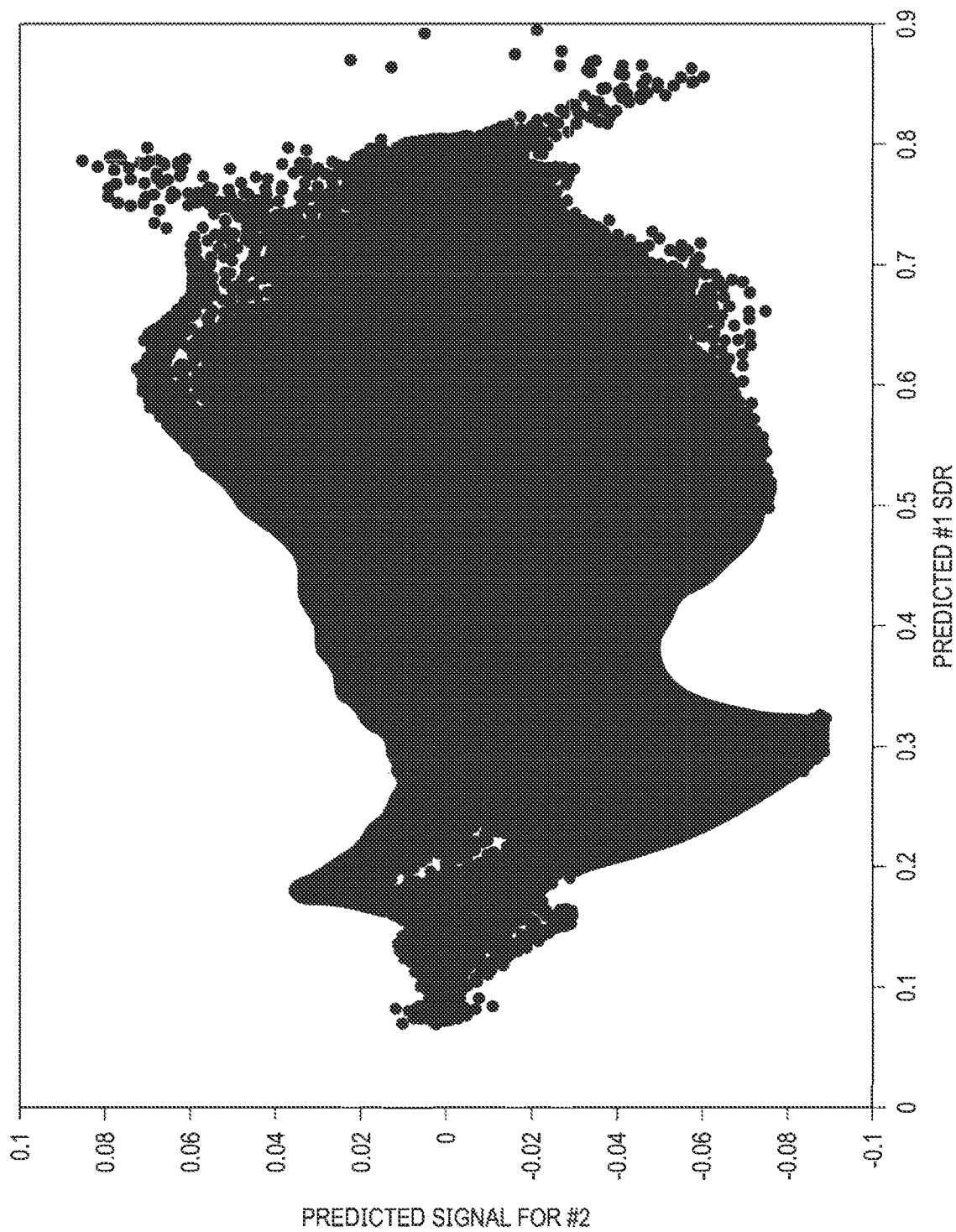

CASCADE PREDICTION

CROSS-REFERENCE TO RELATED APPLICATIONS

This application claims priority to European Patent Application No. 19214124.0 filed 6 Dec. 2019 and U.S. Provisional Patent Application No. 62/944,636 filed 6 Dec. 2019, which are incorporated herein by reference.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, *"Image parameter values for high dynamic range television for use in production and international programme exchange,"* (June 2017). As appreciated by the inventors here, improved techniques for composing video content data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 2A through FIG. 2D illustrate example distributions and correlations of input codewords and predicted codewords;

DESCRIPTION OF EXAMPLE EMBODIMENTS

Figure 1A:
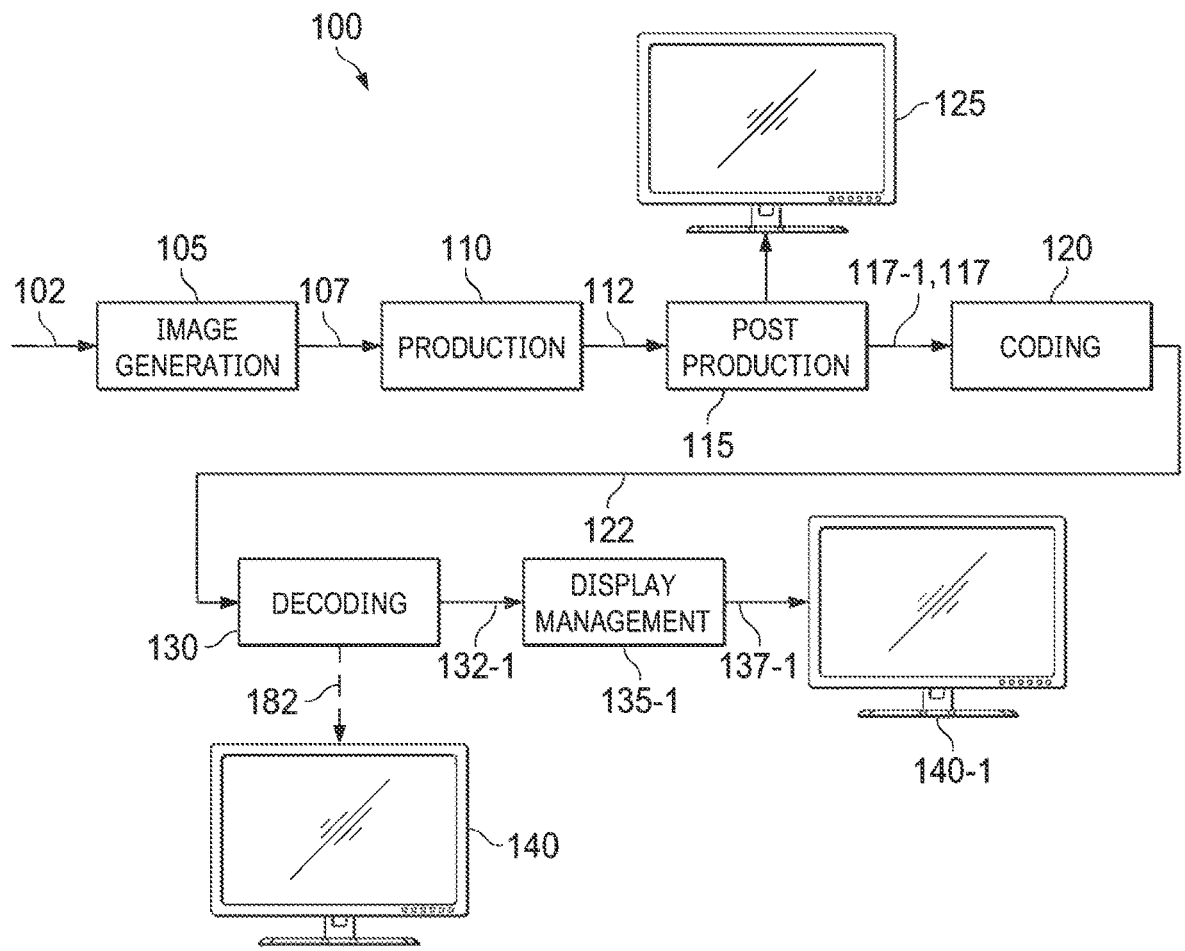
FIG. 1A depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

Summary

Cascade prediction methods as described herein can be implemented and performed in a wide variety of video delivery and display applications including but not limited to those supporting backward compatibility. In some operational scenarios, base layer (BL) image data may be encoded in a first domain (e.g., of a first dynamic range, in a first color space, corresponding to a first Electro-Optic Transfer Function or EOTF, etc.) in a coded bitstream along with image metadata used for generating/reconstructing image data coded in a second domain (e.g., of a second dynamic range, in a second color space, corresponding to a second EOTF, etc.) from the BL image data encoded in the first domain. The BL image data and the image metadata can be provided to recipient decoding and playback devices, which may directly render the BL image data (e.g., of the first dynamic range, in the first color space, corresponding to the first EOTF, etc.) after decoding on displays supporting rendering images in the first domain or which may reconstruct image data in the second domain from the decoded BL image data and image metadata and render the reconstructed image data (e.g., of the second dynamic range, in the second color space, corresponding to the second EOTF, etc.) on displays supporting rendering images in the second domain. The BL or input image data in the first domain and the reconstructed or output image data in the second domain may be of different dynamic ranges. Additionally, optionally or alternatively, the BL or input image data in the first domain and the reconstructed or output image data in the second domain may be of the same dynamic range; however the BL or input image data and the reconstructed or output image data may be in different color spaces and/or may correspond to different EOTFs. For example, the BL or input image data in the first domain may be of a dynamic range with a maximum luminance 1000 nits in an R.2020 color space corresponding to an HLG EOTF, whereas the reconstructed or output image data may be of the same dynamic range with a maximum luminance 1000 nits in an R.2020 color space corresponding to an PQ EOTF. In this example, the first domain and the second domain both have the same dynamic range with the maximum luminance 1000 nits and are also in the same color space; however, the BL or input image data and the reconstructed or output image data may be coded according to, or correspond to, different EOTFs. Thus, so long as at least one attribute of a domain—e.g., among dynamic range, color space or EOTF—in which image data is represented/coded is different between the BL or input image data and the reconstructed or output image data, cascade prediction methods as described herein may be applied. As a result, image data coded in a coded bit stream for a domain supported by some display devices can be used to generate reconstructed image data for one or more other domains supported by some other display devices without needing to other image data for the other domains in the coded bit stream. In some operational scenarios, a wide variety of display device types supporting display or image processing operations in various domains may be supported by coded streams generated under techniques as described herein.

In some operational scenarios, multiple different sets of cascade prediction coefficients may be generated to support various video quality levels in reconstructed image data. For example, a first set of cascade prediction coefficients may be used to construct a first predicted video signal with reconstructed image data to support a first video quality level. A second set of cascade prediction coefficients may be used to construct a refinement signal, which when combined with the first predicted signal gives rise to a second predicted signal with reconstructed image data to support a second video quality level higher than the first video quality level. The different sets of cascade prediction coefficients may be used to support different versions of video decoders or playback devices. Some of the video decoders or playback devices, which may be widely deployed in the field, may only recognize the first set of cascade prediction coefficients and apply the first set of cascade prediction coefficients in prediction operations accordingly. Video quality levels can be gradually improved when additional set(s) of prediction coefficients are recognized and applied in prediction operations by relatively advanced video decoders or playback devices.

Example embodiments described herein relate to generating and encoding cascade prediction metadata for image reconstruction. A first predictor is applied to an input image coded in a first domain to generate first-stage predicted codewords approximating prediction target codewords of a prediction target image coded in a second domain that is different from the first domain. Second-stage prediction target values are created by performing an inverse cascade operation on the prediction target codewords and the first-stage predicted codewords. A second predictor is applied to the input image in the first domain to generate second-stage predicted values approximating the second-stage prediction target values. Multiple sets of cascade prediction coefficients are generated to comprise a first set of cascade prediction coefficients specifying the first predictor and a second different set of cascade prediction coefficients specifying the second predictor. The multiple sets of cascade prediction coefficients are encoded, in a video signal, as image metadata. The video signal is further encoded with the input image In the first domain. A recipient device of the video signal uses the multiple sets of cascade prediction coefficients to apply the first predictor and the second predictor to the input image to generate a predicted image in the second domain. The predicted image in the second domain approximates the prediction target image in the second domain.

Example embodiments described herein relate to decoding cascade prediction metadata for image reconstruction and rendering. An input image coded in a first domain is decoded from a video signal. Image metadata comprising multiple sets of cascade prediction coefficients is decoded from the video signal. The multiple sets of cascade prediction coefficients were generated by an upstream image processing device to comprise a first set of cascade prediction coefficients, generated based at least in part on a prediction target image coded in a second domain, specifying a first predictor and a second set of cascade prediction coefficients, generated based at least in part on the prediction target image in the second domain, specifying a second predictor. The first domain is different from the second domain. The first predictor and the second predictor, as joined by a cascade operation, are applied to the input image in the first domain to generate a reconstructed image in the second domain to approximate the prediction target image in the second domain. A display image derived from the reconstructed image in the second domain is caused to be rendered with a display device.

Example Video Delivery Processing Pipeline

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera, etc.) or generated by a computer (e.g. using computer animation, etc.) to provide video data (107). Additionally, optionally or alternatively, video frames (102) may be captured on film by a film camera. The film can be converted to a digital format to provide the video data (107). In a production phase (110), the video data (107) is edited to provide a video production stream (112).

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield a release version of HDR images (117-1) or SDR (or relatively narrow dynamic range) images (117) (e.g., SDR, etc.). In some embodiments, during post-production editing (115), the HDR images (117-1) are viewed on a reference HDR display that supports the high dynamic range by a colorist who is performing post-production editing operations on the HDR images (117-1). Additionally, optionally or alternatively, during post-production editing (115), the SDR images (117) are viewed on a reference display (125) that supports the standard dynamic range (or a relatively narrow dynamic range) by a colorist who is performing post-production editing operations on the SDR images (117). Additionally, optionally or alternatively, the SDR images (117) may be content mapped from the HDR images (117-1).

In some embodiments, the coding block (120) may implement some or all of cascade prediction operations to generate multiple sets of cascade prediction coefficients. The coding block (120) receives the HDR images (117-1) from the post-production editing (115), and forward reshapes the HDR images (117-1) into (forward) reshaped SDR images. The forward reshaped SDR images may closely approximate the SDR images (117) (if available) from color grading operations. For the purpose of illustration only, the coding block (120) is to generate a coded bitstream that includes SDR images (e.g., forward reshaped SDR images, etc.) and image metadata used by a recipient device of the coded bitstream to reconstruct HDR image from the SDR images. It should be noted, however, that in various embodiments, image data coded/represented in a first domain may be encoded in a coded bitstream along with image metadata used by a recipient device of the coded bitstream to reconstruct image data coded in a second domain from the image data in the first domain.

In some embodiments, the coding block (120) may include audio and video encoders, such as those defined by ATSC, DVB, DVD, Blu-Ray, and other delivery formats, to generate the coded bitstream (122).

The forward reshaped SDR images can be compressed/encoded by the coding block (120) into a coded bitstream (122). The multiple sets of cascade prediction coefficients may be included or encoded in the same coded bitstream as a part of image metadata.

The coded bitstream (122) may represent a video signal (e.g., an 8-bit SDR video signal, a 10-bit SDR video signal, etc.) that is backward compatible with a wide variety of SDR display devices (e.g., SDR displays, etc.). In a non-limiting example, the video signal encoded with the reshaped SDR images may be a single-layer backward compatible video signal. Here, a "single-layer backward compatible video signal" may refer to a video signal that carries SDR images that are specifically optimized or color graded for SDR displays in a single signal layer. Example single layer video coding operations are described in U.S. Provisional Patent Application No. 62/312,450, filed on Mar. 23, 2016, also published on Apr. 11, 2019, as U.S. Patent Application Publication Ser. No. 2019/011054, the entire contents of which are hereby incorporated by reference as if fully set forth herein.

The multiple sets of cascade prediction coefficients may be decoded and used in cascade prediction operations by a recipient device of the video signal or coded bitstream to generate reconstructed HDR images from the decoded forward reshaped SDR images. The reconstructed HDR images may approximate corresponding input or source HDR images in the color graded HDR images (117-1). Different video quality levels may be generated for the reconstructed HDR images using cascade prediction operations (e.g., backward reshaping operations, inverse tone mapping operations, etc.) with the multiple sets of cascade prediction coefficients generated by the (upstream) coding block (120). A used herein, backward reshaping refers to image processing operations that convert images—e.g., to be or as encoded in a coded bitstream—of a first dynamic range to images of a second higher dynamic range. Forward reshaping refers to image processing operations that convert images of a second dynamic range to images—e.g., to be or as encoded in a coded bitstream—of a first higher dynamic range. Example reshaping operations are described in U.S. Provisional Application Ser. No. 62/136,402, filed on Mar. 20, 2015, (also published on Jan. 18, 2018, as U.S. Patent Application Publication Ser. No. 2018/0020224), the entire contents of which are hereby incorporated by reference as if fully set forth herein.

Additionally, optionally, or alternatively, the coded bit stream (122) is encoded with additional image metadata including but not limited to display management (DM) metadata that can be used by the downstream decoders to perform display management operations on the backward reshaped images for the HDR reference displays to generate display images optimized for rendering on other displays such as non-reference HDR displays, etc.

The coded bitstream (122) is then delivered downstream to receivers such as decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be the same as the reshaped SDR images, subject to quantization errors generated in compression performed by the coding block (120) and decompression performed by the decoding block (130).

In operational scenarios in which the receiver operates with (or is attached or operatively linked to) a target display 140 that supports the standard dynamic range or a relatively narrow dynamic range comparable with or less than the standard dynamic range, the decoding block (130) can decode the reshaped SDR images from (e.g., the single layer in, etc.) the coded bitstream (122), and use the decoded reshaped SDR images directly or indirectly for rendering on the target display (140). In embodiments in which the target display (140) is of similar characteristics as the SDR reference display (125), the reshaped SDR images can be directly watchable on the target display (140).

In some embodiments, the receiver operates with (or is attached or operatively linked to) a HDR target display 140-1 that supports a high dynamic range (e.g., 400 nits, 1000 nits, 4000 nits, 10000 nits or more, etc.) can extract image metadata from (e.g., metadata container(s) in, etc.) the coded bitstream (122), use two or more of the multiple sets of cascade prediction coefficients in the image metadata (or composer metadata) to compose backward reshaped images 132-1 from the reshaped SDR images by backward reshaping—including but not limited to performing cascade prediction operations on—the reshaped SDR images based at least in part on the image metadata (composer metadata).

In some operational scenarios, the backward reshaped images (132-1) represent reconstructed HDR images optimized for viewing on an HDR (e.g., reference, etc.) display that is the same as, or comparable with, an HDR target display operating in conjunction with the receiver. The receiver may directly use the backward reshaped images (132-1) for rendering on the HDR target display.

In some operational scenarios, the backward reshaped images (132-1) represent reconstructed HDR images optimized for viewing on an HDR (e.g., reference, etc.) display that is not the same as an HDR target display (140-1) operating in conjunction with the receiver. A display management block (e.g., 135-1, etc.)—which may be in the receiver, in the HDR target display (140-1), or in a separate device—further adjusts the backward reshaped images (132-1) to characteristics of the HDR target display (140-1) by generating a display-mapped signal (137-1) adapted to the characteristics of the HDR target display (140-1). Display images or the adjusted backward reshaped images may be rendered on the HDR target display (140-1).

Video Codecs and Cascade Prediction

Figure 1B:
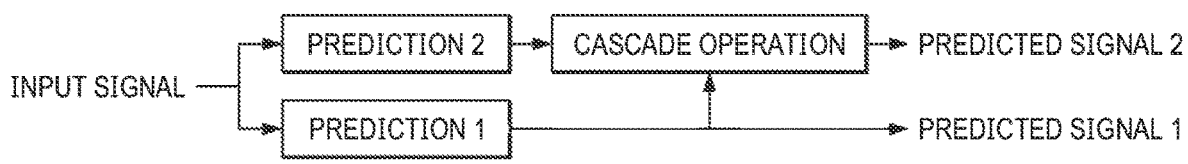
FIG. 1B through FIG. 1F illustrate example codecs implementing cascade prediction operations.

FIG. 1B illustrates example two-stage cascade prediction operations at the decoder side. As shown, an input signal is fed as input into a first prediction block (denoted as "prediction 1"), which generates a first predicted (video) signal (denoted as "predicted signal 1") as output. The input signal is also fed as input into a second prediction block (denoted as "prediction 2") to generate a predicted residual (video) signal as output. The first predicted signal as outputted from the first prediction block and the predicted residual signal as generated by the second prediction block are fed as input into a cascade operational block, which performs a merge operations (e.g., addition, multiplication, etc.) on the inputted signals to generate a second predicted (video) signal (denoted as "predicted signal 2") as output. The second predicted signal represents a reconstructed video signal that is of higher accuracy and better quality than the first predicted signal, in relation to a source or input (video) signal to which each of the first predicted signal and the second predicted signal is tasked to approximate.

In some operational scenarios, the first prediction block of FIG. 1B performs prediction operations in a luma channel (denoted as "Y") of a color space (e.g., YCbCr, etc.) with an 8-piece 2nd order polynomial and in chroma channels (denoted as "Cb" or "C0", "Cr" or "C1") of the color space with MMR coefficients. The second prediction block of FIG. 1B performs prediction operations in some or all of the luma and chroma channels with MMR (Multiple color channel Multiple Regression) coefficients or TPB (Tensor Product B-spline) prediction coefficients. In scenarios in which MMR-based prediction are used in both the first and second prediction blocks, some or all processing logics implementing MMR-based prediction may be re-used in these prediction blocks. Example cumulative density function (CDF) matching operations are described in PCT Application No. PCT/US2017/50980, filed on Sep. 11, 2017; U.S. Provisional Application Ser. No. 62/404,307, filed on Oct. 5, 2016, (also published in Apr. 5, 2018, as U.S. Patent Application Publication Ser. No. 2018/0098094), the entire contents of which are hereby incorporated by reference as if fully set forth herein. Examples of MMR operations are described in U.S. Pat. No. 8,811,490, which are incorporated by reference in its entirety as if fully set forth herein. Examples of TPB operations are described in U.S. Provisional Application Ser. No. 62/908,770, titled "TENSOR-PRODUCT B-SPLINE PREDICTOR," filed on Oct. 1, 2019, which are incorporated by reference in its entirety as if fully set forth herein.

Figure 1C:
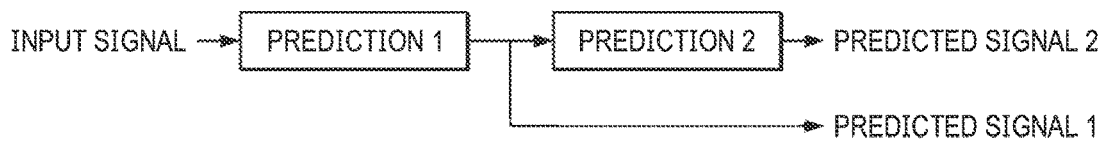

FIG. 1C illustrates example two-stage prediction based on a function-of-function model. In this model, the output of the first prediction block is fed directly into the second prediction block. In some operational scenarios, the prediction operations in this model may gain no or little additional information beyond what has been obtained by the first prediction block. In contrast, in a cascade model as illustrated in FIG. 1B, the second prediction block receives original image data from the input (or source) signal directly. Thus, the second prediction block is better position to correct prediction errors or inaccuracies generated by the first prediction block.

Example advantages and benefits produced by cascade prediction as described herein include but are not necessarily limited to only: (1) backward compatibility to existing codec architectures; (2) parallel processing for the first prediction block and the second prediction block, which can be exploited or implemented to provide relatively low (e.g., processing, overall, etc.) delay and relatively independent prediction processing.

Figure 1D:
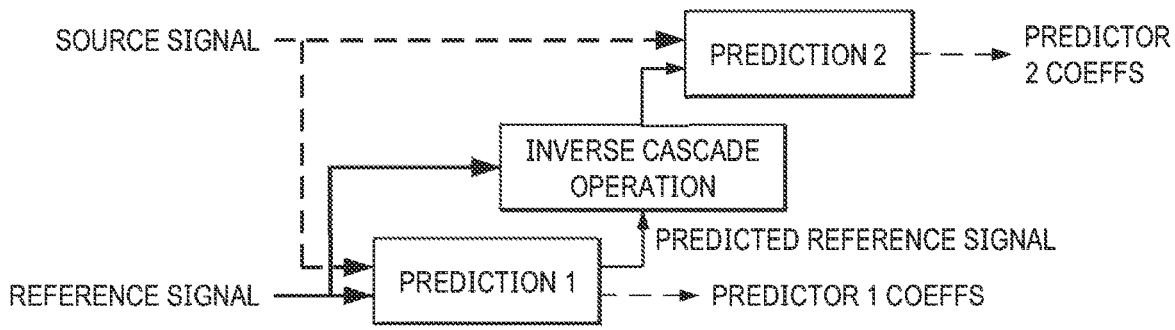

FIG. 1D illustrates example encoder-side architecture for cascade prediction. A video codec (e.g., video encoder, video transcoder, etc.) receives a source (video) signal and a reference (video) signal. For the purpose of illustration only, the source signal comprises SDR images (e.g., to be encoded in a coded bitstream such as 122 of FIG. 1A, forward reshaped SDR images, etc.). The reference signal comprises reference HDR images to which reconstructed HDR images generated by a recipient device from the SDR images are to approximate. The goal for the codec is to generate multiple sets of cascade prediction coefficients such that, when applying one, some or all of the multiple sets of cascade prediction coefficients to the SDR images in the source signal, reconstructed HDR images are generated in a predicted (video) signal to approximate (e.g., closely, with a specific quality level among multiple quality levels, as closely as possible, etc.) to the reference HDR images in the reference signal.

A first set of cascade prediction coefficients (e.g., specifying an 8-piece 2nd order polynomial and MMR coefficients, etc.) in the multiple sets of cascade prediction coefficients may be used by a first population of recipient decoding or playback devices that are deployed in the field relatively extensively to generate first reconstructed HDR images that approximate the reference HDR images at a first quality level.

As illustrated in FIG. 1D, the codec may use a first prediction block (denoted as "Prediction 1") to receive the reference and source signals, generate the first set of cascade prediction coefficients based at least in part on the received reference and source signals, output the first set of cascade prediction coefficients (denoted as "Predictor 1 coeffs") as a part of image metadata (or composer metadata) to be encoded along with the source signal in a coded bitstream (e.g., 122 of FIG. 1A, etc.), and generate and output a first predicted (video) signal that is generated based at least in part on the first set of cascade prediction coefficients from the source images in the source signal.

A second set of cascade prediction coefficients (e.g., specifying MMR coefficients or TPB prediction coefficients, etc.) in the multiple sets of cascade prediction coefficients may be used along with the first set by a second population of recipient decoding or playback devices that are relatively advanced to generate second reconstructed HDR images that approximate the reference HDR images at a second quality level higher than the first quality level.

As illustrated in FIG. 1D, the codec may use two stages to generate the second set of cascade prediction coefficients. The first stage is implemented by an inverse cascade operation block to generate a second reference signal and output the second reference signal to a second prediction block (denoted as "Prediction 2"). The inverse cascade operation block may implement an inverse cascade operation such as an inverse of (or the opposite to) a cascade operation to be applied by a recipient decoder or playback device. In addition to receiving the second reference signal generated by the inverse cascade operation block, the second prediction block also receives the same source signal received by the first prediction block. The second prediction block generates the second set of cascade prediction coefficients based at least in part on the source signal and the second reference signal such that a predicted residual signal can be generated from the source signal based at least in part on the second set of cascade prediction coefficients to approximate as closely as possible to the second reference signal outputted from the inverse cascade operation block. The codec of FIG. 1D may (e.g., on demand, dynamically, statically, etc.) include the second set of cascade prediction coefficients (denoted as "Predictor 2 coeffs") as a part of the image metadata in the coded bitstream to be delivered to recipient decoder or playback device(s).

Figure 1E:
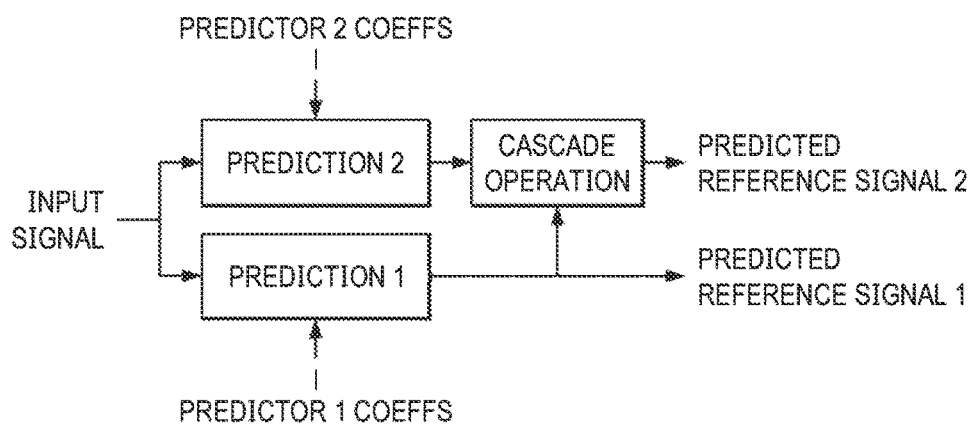

FIG. 1E illustrates example decoder-side architecture for cascade prediction. A video codec (e.g., video decoder, video transcoder, etc.) decodes a received coded bitstream (e.g., 122 of FIG. 1A, etc.) into a decoded version (which may be same as the source signal subject to quantization/coding errors incurred by coding/decoding or compression/decompression) of the source signal and one or more of the multiple sets of cascade prediction coefficients generated by an upstream codec (e.g., in FIG. 1D, the coding block (120), etc.).

The one or more of the multiple sets of cascade prediction coefficients comprise the first set of cascade prediction coefficients. A first prediction block (denoted as "Prediction 1") of the codec of FIG. 1E may receive the source signal (or the decoded version thereof) and the first set of cascade prediction coefficients (denoted as "Predictor 1 coeffs"), and generate first reconstructed HDR images (in a first predicted reference signal) from the SDR images in the source signal based at least in part on the first set of cascade prediction coefficients. The first reconstructed HDR images approximates the reference HDR images (in the reference signal of FIG. 1D) at the first quality level.

In some operational scenarios, the codec of FIG. 1E derives first display images based on the first reconstructed HDR images and rendered the first display images on an HDR display device without involving any further sets of cascade prediction coefficients other than the first set of cascade prediction coefficients.

In some operational scenarios, the codec of FIG. 1E decodes the second set of cascade prediction coefficients (denoted as "Predictor 2 coeffs") from the received coded bitstream and uses a Prediction 2 to receive the source signal (or the decoded version thereof) and the second set of cascade prediction coefficients as input and generate the predicted residual signal from the source signal based at least in part on the second set of cascade coefficients. The predicted residual signal may be outputted by the Prediction 2 to the cascade operation block (denoted as "Prediction 2"). The first predicted signal may be outputted by the first prediction block to the cascade operation block, which combines the predicted residual signal with the first prediction signal to generate a second predicted signal comprising second reconstructed HDR images approximating the reference HDR images at a second quality level higher than the first quality level.

Cascade Prediction in Forward and Backward Mappings at Encoders

In some operational scenarios, a video encoder as described herein may perform both (HDR-to-SDR) forward mapping and (SDR-to-HDR) backward mapping as a part of overall image processing operations performed by the encoder. For example, the encoder may receive a reference (or input) HDR video signal and a content-mapped SDR video signal. One or more of the video signals may be a result of color grading operations, for example performed by colorist(s) using an SDR reference display, an HDR reference display, both SDR and HDR reference displays, and so forth. Additionally, optionally or alternatively, image data in one of the video signals may be content-mapped from corresponding image data in the other the video signals, for example fully automatically without user intervention or manual input, substantially automatically with user intervention and manual input, and so forth.

Cascade prediction may be applied to the forward mapping as well as the backward mapping in the encoder. Accuracies and qualities of both the forward mapping and the backward mapping can be improved by the application of cascade prediction in the encoder.

To apply cascade prediction as described herein to either the forward mapping or the backward mapping at the encoder side, a multi-stage (or cascade) prediction that is the same as or similar to what is depicted in FIG. 1D may be implemented and performed.

Cascade Prediction in Forward Mapping at Encoders

Suppose there are P pixels in each of an input j-th SDR image in an input SDR video signal (as received by a video encoder) and an input j-th HDR image (depicting the same visual semantic content as the input SDR image but with a higher luminance dynamic range) in an input HDR video signal (as received by the video encoder).

Let triplets $(s_{ji}^{y}, s_{ji}^{c0}, s_{ji}^{c1})$ and $(v_{ji}^{y}, v_{ji}^{c0}, v_{ji}^{c1})$ represent normalized Y, $C_0$ and $C_1$ values (of a color space such as YCbCr or $YC_0C_1$) for the i-th pixel in the j-th SDR and HDR images respectively.

In the luma or luminance channel (denoted as Y) of the color space, a single-channel luma prediction operation may be performed to map or forward reshape the HDR codeword $\{v_{ji}^y\}$ into a predicted or mapped SDR codeword (denoted as $\{\hat{s}_{ji}^{y,1}\}$) using a luma forward reshaping function $f_j^{y,1}(\ )$ to approximate the SDR codeword $\{s_{ji}^y\}$, as follows:

$$\hat{s}_{ji}^{y,1}=f_j^{y,1}(v_{ji}^y) \qquad (1)$$

The luma forward reshaping function may be a one-dimensional lookup table (1D-LUT)—or a FLUT—that provides a one-to-one mapping from HDR luma codewords/values to predicted or mapped SDR luma codewords/values. The luma forward reshaping function may be generated using the input HDR signal as the input (e.g., comprising to-be-mapped HDR codewords $\{v_{ji}^y\}$, etc.) for prediction and the input SDR signal as the reference (e.g., comprising SDR codewords $\{s_{ji}^y\}$ to be approximated by predicted SDR codewords $\{\hat{s}_{ji}^{y,1}\}$, etc.) for prediction.

However, luma codewords/values/intensities of pixels are often influenced by chroma components of these pixels. The single-channel luma forward reshaping function may not be adept in capturing cross-color information or influence between the chroma components and the luma components of the pixels. As a result, the predicted SDR codeword $\{\hat{s}_{ji}^{y,1}\}$ may deviate from the expected SDR codeword represented by the input SDR codeword $\{s_{ji}^y\}$ that is to be approximated by the predicted SDR codeword $\{\hat{s}_{ji}^{y,1}\}$.

To overcome shortcomings associated with the single-channel luma forward reshaping function, the single-channel luma forward reshaping function may be regarded (e.g., only, etc.) as a first luma forward prediction function generated with the input SDR signal as a first prediction target signal comprising first prediction target values. A second luma forward prediction function $f_j^{y,2}(\ )$ may be used to further incorporate (or better capture) chroma information or influence on the luma component.

A second prediction target signal (denoted as $\Delta s_{ji}^{y,2}$) may be generated to comprise second prediction target values to which second predicted values generated using the second luma forward prediction function are to approximate, as follows:

$$\Delta s_{ji}^{y,2}=s_{ji}^y-\hat{s}_{ji}^{y,1} \qquad (2)$$

where the operator "−" on the right-hand side of expression (2) represents an inverse cascade operator $OP^{-1}(\ )$. For the purpose of illustration only, the inverse cascade operator $OP^{-1}(\ )$ is represented as a subtraction operator in expression (2). It should be noted that, in various embodiments, an inverse cascade operator as described herein may be represented as a subtraction operator, a division operator, a reversible operator, a functional-based operator, etc.

The second luma forward prediction function (denoted as $f_j^{y,2}$) may be generated using HDR luma and/or chroma codewords (e.g., $v_{ji}^y$, $v_{ji}^{c0}$, $v_{ji}^{c1}$, etc.)—or a specific function thereof—in the input HDR image as input and using the second prediction target signal $\Delta s_{ji}^{y,2}$ as a prediction target. Once generated, the second luma forward prediction function $f_j^{y,2}$ can be used to map the HDR luma and chroma codewords $v_{ji}^y$, $v_{ji}^{c0}$, $v_{ji}^{c1}$—or the specific function thereof—in the input HDR image into predicted codeword residuals $\Delta \hat{s}_{ji}^{y,2}$, as follows:

$$\Delta\hat{s}_{ji}^{y,2}=f_j^{y,2}(v_{ji}^y,v_{ji}^{c0},v_{ji}^{c1}) \qquad (3)$$

An overall luma forward prediction function (denoted as $f_j^y(\ )$) may be given as both the first and second luma forward prediction functions joined with a cascade operator $OP(\ )$, as follows:

$$f_j^y(\ )=OP(f_j^{y,1}(\ ),f_j^{y,2}(\ ))=f_j^{y,1}(\ )+f_j^{y,2}(\ ) \qquad (4)$$

where the operator "+" on the right-hand side of expression (4) represents the cascade operator $OP(\ )$ that is an inverse to the inverse cascade operator $OP^{-1}(\ )$ in expression (2). For the purpose of illustration only, the cascade operator $OP(\ )$ is represented as an addition operator in expression (4). It should be noted that, in various embodiments, a cascade operator as described herein may be represented as an addition operator, a multiplication operator, a reversible operator, a functional-based operator, etc., so long as the cascade operation as represented in expression (4) is conjugate to the inverse cascade operation in expression (2).

More specifically, a forward reshaped SDR signal comprising overall mapped (or overall forward reshaped) SDR codewords/values in the SDR luma channel may be obtained by adding the second mapped values—generated by applying the second luma forward prediction function to the input HDR signal—as predicted residues to first mapped values generated by applying the first luma forward prediction function to the input HDR signal, as follows:

$$\hat{s}_{ji}^y=\hat{s}_{ji}^{y,1}+\Delta\hat{s}_{ji}^{y,2} \qquad (5)$$

Forward prediction (or prediction operations in forward reshaping) in a chroma channel (or a non-luma channel) can follow a similar cascade process to that described herein for forward prediction in the luma channel. In various embodiments, the forward prediction in chroma channels may use similar or different choices of prediction functions as used in the forward prediction in the luma channel. By way of illustration but not limitation, the forward prediction in the chroma channels may select the first chroma prediction function to be a second order MMR operator (as specified with second order MMR coefficients) for predicting SDR chroma codewords/values in the chroma channels, and further select the second chroma prediction function to be a third order MMR operator (as specified with third order MMR coefficients) or some other operator (e.g., other than a second order MMR operator, etc.) for predicting residual SDR chroma codewords/values in the chroma channels.

An SDR signal of forward reshaped SDR images comprising forward reshaped SDR codewords/values generated with the cascade forward prediction as described herein may be encoded in a coded bitstream (e.g., 122 of FIG. 1A, etc.) with backward reshaping metadata for generating and rendering reconstructed HDR images from the forward reshaped SDR images and delivered to downstream decoder and/or playback devices.

Cascade Prediction in Backward Mapping at Encoders

Suppose there are P pixels in each of a (to-be-backward reshaped) j-th SDR image in an SDR video signal and a (corresponding prediction target) j-th HDR image (depicting the same visual semantic content as the SDR image but with a higher luminance dynamic range) in an HDR video signal.

Let triplets $(s_{ji}^y, s_{ji}^{c0}, s_{ji}^{c1})$ and $(v_{ji}^y, v_{ji}^{c0}, v_{ji}^{c1})$ represent normalized Y, $C_0$ and $C_1$ values (of a color space such as YCbCr or $YC_0C_1$) for the i-th pixel in the j-th SDR and HDR images respectively.

In the luma or luminance channel (denoted as Y) of the color space, a single-channel luma prediction operation may be performed to map or backward reshape the SDR codewords $\{s_{ji}^y\}$ to a predicted or mapped HDR codeword (denoted as $\{\hat{v}_{ji}^{y,1}\}$) using a luma backward reshaping function $b_j^{y,1}(\ )$ to approximate the HDR codeword $\{v_{ji}^y\}$, as follows:

$$\hat{v}_{ji}^{y,1}=b_j^{y,1}(s_{ji}^y) \qquad (6)$$

The luma backward reshaping function may be a one-dimensional lookup table (1D-LUT)—or a BLUT—that provides a one-to-one mapping from SDR luma codewords/values to predicted or mapped HDR luma codewords/values. The luma backward reshaping function may be generated using the (to-be-backward-reshaped) SDR image as the input (e.g., comprising to-be-mapped SDR codewords $\{s_{ji}^y\}$, etc.) for prediction and the (prediction target) HDR image as the reference (e.g., comprising HDR codewords $\{v_{ji}^y\}$ to be approximated by predicted HDR codewords $\{\hat{v}_{ji}^{y,1}\}$, etc.) for prediction.

However, luma codewords/values/intensities of pixels are often influenced by chroma components of these pixels. The single-channel luma backward reshaping function may not be adept in capturing cross-color information or influence between the chroma components and the luma components of the pixels. As a result, the predicted HDR codeword $\{\hat{v}_{ji}^{y,1}\}$ may deviate from the expected HDR codeword represented by the HDR codeword $\{v_{ji}^y\}$ that is to be approximated by the predicted HDR codeword $\{\hat{v}_{ji}^{y,1}\}$.

To overcome shortcomings associated with the single-channel luma backward reshaping function, the single-channel luma backward reshaping function may be regarded (e.g., only, etc.) as a first luma backward prediction function generated with the (prediction target) HDR image as a prediction target comprising first prediction target values. A second luma backward prediction function $b_j^{y,2}$ may be used to further incorporate (or better capture) chroma information or influence on the luma component.

A second prediction target signal (denoted as $\Delta v_{ji}^{y,2}$) may be generated to comprise second prediction target values to which second predicted values generated using the second luma backward prediction function are to approximate, as follows:

$$\Delta v_{ji}^{y,2} = v_{ji}^y - \hat{v}_{ji}^{y,1} \qquad (7)$$

where the operator "−" on the right-hand side of expression (7) represents an inverse cascade operator $OP^{-1}(\ )$. For the purpose of illustration only, the inverse cascade operator $OP^{-1}(\ )$ is represented as a subtraction operator in expression (7). It should be noted that, in various embodiments, an inverse cascade operator as described herein may be represented as a subtraction operator, a division operator, a reversible operator, a functional-based operator, etc. Additionally, optionally or alternatively, in various embodiments, similar or different types of inverse cascade operators may be used in forward reshaping and backward reshaping. Thus, there is no need to use identical types of inverse cascade operations in forward reshaping and backward reshaping.

The second luma backward prediction function (denoted as $b_j^{y,2}$) may be generated using (to-be-backward-reshaped) SDR luma and chroma codewords (e.g., $s_{ji}^y$, $s_{ji}^{c0}$, $s_{ji}^{c1}$, etc.)—or a specific function thereof—in the (to-be-backward-reshaped) SDR image as input and using the second prediction target signal $\Delta v_{ji}^{y,2}$ as a prediction target. Once generated, the second luma backward prediction function $b_j^{y,2}$ can be used to map the (to-be-backward-reshaped) SDR luma and chroma codewords $s_{ji}^y$, $s_{ji}^{c0}$, $s_{ji}^{c1}$—or the specific function thereof—in the (to-be-backward-reshaped) SDR image into predicted codeword residuals $\Delta \hat{v}_{ji}^{y,2}$, as follows:

$$\Delta \hat{v}_{ji}^{y,2} = b_j^{y,2}(s_{ji}^y, s_{ji}^{c0}, s_{ji}^{c1}) \qquad (8)$$

An overall luma backward prediction function (denoted as $b_j^y(\ )$) may be given as both the first and second luma backward prediction functions joined with the inverse cascade operator $OP(\ )$, as follows:

$$b_j^y(\ ) = OP(b_j^{y,1}(\ ), b_j^{y,2}(\ )) = b_j^{y,1}(\ ) + b_j^{y,2}(\ ) \qquad (9)$$

where the operator "+" on the right-hand side of expression (9) represents a cascade operator $OP(\ )$ that is an inverse to the inverse cascade operator $OP^{-1}(\ )$ in expression (7). For the purpose of illustration only, the cascade operator $OP(\ )$ is represented as an addition operator in expression (9). It should be noted that, in various embodiments, a cascade operator as described herein may be represented as an addition operator, a multiplication operator, a reversible operator, a functional-based operator, etc., so long as the cascade operation as represented in expression (9) is conjugate to the inverse cascade operation in expression (7). Additionally, optionally or alternatively, in various embodiments, similar or different types of cascade operators may be used in forward reshaping and backward reshaping. Thus, there is no need to use identical types of cascade operations in forward reshaping and backward reshaping.

More specifically, a backward reshaped HDR signal comprising overall mapped (or overall backward reshaped) HDR codewords/values in the HDR luma channel may be obtained by adding the second mapped values—generated by applying the second luma backward prediction function to the (to-be-backward-reshaped) SDR signal—or SDR images therein—as predicted residues to first mapped values generated by applying the first luma backward prediction function to the (to-be-backward-reshaped) SDR signal or the SDR images therein, as follows:

$$\hat{v}_{ji}^y = \hat{v}_{ji}^{y,1} + \Delta \hat{v}_{ji}^{y,2} \qquad (10)$$

Backward prediction (or prediction operations in backward reshaping) in a chroma channel (or a non-luma channel) can follow a similar cascade process to that described herein for backward prediction in the luma channel. In various embodiments, the backward prediction in chroma channels may use similar or different choices of prediction functions as used in the backward prediction in the luma channel. By way of illustration but not limitation, the backward prediction in the chroma channels may select the first chroma prediction function to be a second order MMR operator (as specified with second order MMR coefficients) for predicting HDR chroma codewords/values in the chroma channels, and further select the second chroma prediction function to be a third order MMR operator (as specified with third order MMR coefficients) or some other operator (e.g., other than a second order MMR operator, etc.) for predicting residual HDR chroma codewords/values in the chroma channels.

A first set of cascade prediction coefficients (or prediction operational parameters) that specifies a first backward reshaping mapping such as the first luma and chroma backward prediction functions and a second set of cascade prediction coefficients (or prediction operational parameters) that specifies a second backward reshaping mapping such as the second luma and chroma backward prediction functions may be included as a part of image metadata in a coded bitstream (e.g., 122 of FIG. 1A, etc.) encoded with the (to-be-backward-reshaped) SDR images and delivered to downstream decoder and/or playback devices for generating and rendering reconstructed HDR images from the SDR images.

Cascade Prediction at Decoders

In some operational scenarios, as illustrated in FIG. 1E, a codec such as a video decoder performs only backward mapping from SDR to HDR. For the purpose of illustration only, decoder-side backward mapping may be first explained in terms of luma backward reshaping (or backward reshaping in the luma channel). The decoder decodes or reads in multiple sets of cascade prediction coefficients from a received coded bitstream (e.g., 122 of FIG. 1A, etc.) or image metadata containers therein.

The multiple sets of cascade prediction coefficients comprise a first set of cascade prediction coefficients for a first prediction operation and a second set of cascade prediction coefficients for a second prediction operation. The first set of cascade prediction coefficients may specify a first luma backward prediction function $b_j^{y,1}(\ )$, for example as an 8-piece second order polynomial that maps decoded SDR codewords $\{s_{ji}^y\}$ to predicted HDR codewords $\{\hat{v}_{ji}^{y,1}\}$ that approximates reference HDR images in a prediction target (or reference) HDR signal in an upstream device that generates the multiple sets of cascade prediction coefficients, as follows:

$$\hat{v}_{ji}^{y,1} = b_j^{y,1}(s_{ji}^y) \qquad (11)$$

In some operational scenarios, the decoder may generate display images from first predicted/reconstructed HDR images comprising the predicted HDR luma codewords $\{\hat{v}_{ji}^{y,1}\}$ generated with the first luma backward prediction function and render the display images with a display device operating in conjunction with the decoder.

In some operational scenarios, the decoder may (e.g., concurrently, in parallel processing, etc.) use a second luma backward prediction function $b_j^{y,2}$ as specified by the second set of cascade prediction coefficients to predict or estimate a difference signal (e.g., prediction residuals) $\Delta\hat{v}_{ji}^{y,2}$ from decoded SDR luma and chroma codewords (e.g., $s_{ji}^y$, $s_{ji}^{c0}$, $s_{ji}^{c1}$, etc.) or a specific function thereof, as follows:

$$\Delta\hat{v}_{ji}^{y,2} = b_j^{y,2}(s_{ji}^y, s_{ji}^{c0}, s_{ji}^{c1}) \qquad (12)$$

The estimated difference signal generated with the second luma backward prediction function is added using a cascade operation onto the predicted HDR codewords $\{\hat{v}_{ji}^{y,1}\}$ generated with the first luma backward prediction function to obtain second predicted or backward reshaped HDR images in a further improved predicted signal (denoted as $\hat{v}_{ji}^y$), as follows:

$$\hat{v}_{ji}^y = \hat{v}_{ji}^{y,1} + \Delta\hat{v}_{ji}^{y,2} \qquad (13)$$

Chroma components of the first and second predicted/reconstructed HDR images may be obtained similarly. In some operational scenarios, the first chroma backward prediction function/mapping may be a three-channel MMR predictor or function. The second chroma backward prediction function/mapping can be an MMR predictor or function of different order or different type, or another predictor/function that is different or divers from (or more advanced than) the first chroma backward prediction function/mapping.

Example Cascade Predictor and Operation Types/Categories

In some operational scenarios, a first cascade predictor among multiple cascade predictors may, but is not necessarily limited to only, a relatively simple predictor (e.g., a single-channel predictor, a lower order polynomial, a lower order MMR operator, etc.), whereas a second or a further cascade predictor among the multiple cascade predictors may, but is not necessarily limited to only, a relatively complex or advanced predictor (e.g., a cross-channel predictor, a higher order polynomial, a higher order MMR operator, etc.).

In some operational scenarios, two or more cascade predictors among multiple cascade predictors may, but is not necessarily limited to only, predictors of comparable complexity. The two or more cascade predictors may be diverse or different in types or categories.

By way of illustration only, HDR to SDR mappings (e.g., backward reshaping mappings, etc.) may be used as examples to explain different types or categories of cascade predictors or operations. It should be noted that in various embodiments, similar or different types or categories of cascade predictors or operations to or from those for the HDR to SDR mappings may be used for SDR to HDR mappings (e.g., forward reshaping mappings, etc.).

A first example type or category of cascade predictor is single-variable functions using polynomials with a single input variable composed of codewords in chroma channel(s). Since only one input variable is used, chroma saturation is one candidate among many different candidates. The chroma saturation (denoted as $v_{ji}^\pi$) may be defined or computed as follows:

$$v_{ji}^\pi = \sqrt{(v_{ji}^{c0})^2 + (v_{ji}^{c1})^2} \qquad (14)$$

The first example type of cascade predictor may be represented by a polynomial with the chroma saturation in expression (14) as the single input variable may be denoted as $f_j^{poly,y,2}(v_{ji}^\pi)$. Polynomial coefficients of such a polynomial representing a cascade predictor may be obtained through minimizing an error measure/cost as a function of a prediction target signal (e.g., a to-be-approximated signal, etc.) and a prediction input signal (e.g., a to-be-forward-reshaped signal, a to-be-backward-reshaped signal, etc.).

A second example type or category of cascade predictor is MMR predictors/functions with codewords in chroma channels as input. Many options exist in choosing input variables.

As a first example option, two input variables $v_{ji}^{c0}$ and $v_{ji}^{c1}$ may be used in an MMR predictor/function (denoted as $f_j^{MMR,y,2}(v_{ji}^{c0}, v_{ji}^{c1})$) as described herein.

As a second example option, two input variables $v_{ji}^y$ and $v_{ji}^\pi$ may be used in an MMR predictor/function (denoted as $f_j^{MMR,y,2}(v_{ji}^y, v_{ji}^\pi)$) as described herein.

As a third example option, three input variables $v_{ji}^y$, $v_{ji}^{c0}$, and $v_{ji}^{c1}$ may be used in an MMR predictor/function (denoted as $f_j^{MMR,y,2}(v_{ji}^y, v_{ji}^{c0}, v_{ji}^{c1})$) as described herein.

As a fourth example option, three input variables $v_{ji}^\pi$, i, and j may be used in an MMR predictor/function (denoted as $f_j^{MMR,y,2}(v_{ji}^\pi, i, j)$) as described herein. The input variables i and j may be used to efficiently capture local variation at specific pixel position(s).

MMR prediction coefficients of an MMR predictor representing a cascade predictor may be obtained through minimizing an error measure/cost as a function of a prediction target signal (e.g., a to-be-approximated signal, etc.) and a prediction input signal (e.g., a to-be-forward-reshaped signal, a to-be-backward-reshaped signal, etc.).

A third example type or category of cascade predictor is TPB predictors/functions with codewords in chroma channels as input. Many options exist in choosing input variables.

As a first example option, two input variables $v_{ji}^{c0}$ and $v_{ji}^{c1}$ may be used in a TPB predictor/function (denoted as $f_j^{PB,y,2}(v_{ji}^{c0}, v_{ji}^{c1})$) as described herein.

As a second example option, two input variables $v_{ji}^y$ and $v_{ji}^\pi$ may be used in an MMR predictor/function (denoted as $f_j^{PB,y,2}(v_{ji}^y, v_{ji}^\pi)$) as described herein.

As a third example option, three input variables $v_{ji}^y$, $v_{ji}^{c0}$, and $v_{ji}^{c1}$ may be used in an MMR predictor/function (denoted as $f_j^{PB,y,2}(v_{ji}^\pi, v_{ji}^{c0}, v_{ji}^{c1})$) as described herein.

As a fourth example option, three input variables $v_{ji}^\pi$, i, and j may be used in an MMR predictor/function (denoted as $f_j^{PB,y,2}(v_{ji}^\pi,i,j)$) as described herein. The input variables i and j may be used to efficiently capture local variation at specific pixel position(s).

TPB prediction coefficients of an TPB predictor representing a cascade predictor may be obtained through minimizing an error measure/cost as a function of a prediction target signal (e.g., a to-be-approximated signal, etc.) and a prediction input signal (e.g., a to-be-forward-reshaped signal, a to-be-backward-reshaped signal, etc.).

Additionally, optionally or alternatively, types or categories of cascade predictors (e.g., non-polynomial, non-MMR, non-TPB, etc.) other than those illustrated herein may be used in a type or category of cascade predictors. Additionally, optionally or alternatively, input variables other than those illustrated herein may be used in a type or category of cascade predictors.

In various embodiments, similar or different types or categories of (e.g., reversible, invertible, etc.) cascade operations and their conjugate or inverse cascade operations may be used.

A first example cascade operation is an (arithmetic) addition such as in $f_j^y( )=f_j^{y,1}( )+f_j^{y,2}( )$. A second example cascade operations is an (arithmetic) multiplication such as in $f_j^y( )=f_j^{y,1}( ) \cdot f_j^{y,2}( )$.

Additionally, optionally or alternatively, types of cascade operations other than those (arithmetic addition and multiplication) illustrated herein may be used in a type or category of cascade predictors.

Multiple Cascade Prediction

Figure 1F:
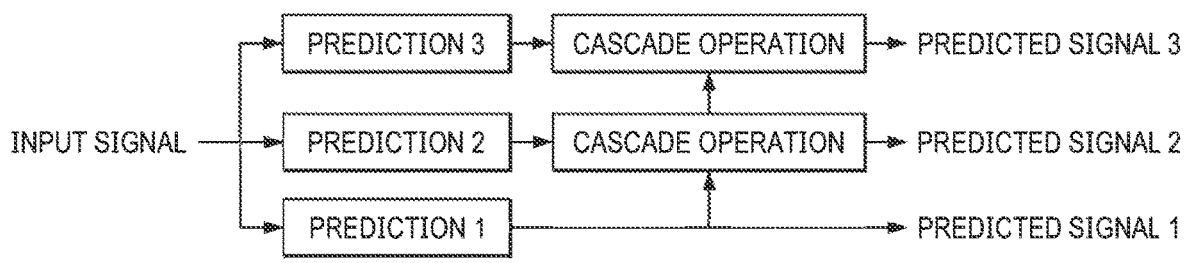

Two-stage cascade prediction can be extended to multiple (or multiple-stage) cascade prediction such as three-stage cascade prediction. In some operational scenarios, multiple piecewise MMR operators may be generated as multiple predictors in cascade prediction as described herein. Additionally, optionally or alternatively, instead of or in addition to creating 1D-LUT to guide MMR prediction (e.g., single-channel multi-piece MMR prediction, multi-channel single-piece MMR prediction, etc.), cascade prediction may be applied to support multi-channel multi-piece MMR prediction without needing to perform special handling at piece partition boundaries such as fusing multiple MMR prediction results at the piece partition boundaries. For example, different types of multi-channel multi-piece MMR predictions may be implemented in different successive or cascade prediction stages with relatively high computational efficiency and relatively high performance. As illustrated in FIG. 1F, a third prediction operation (denoted as "Prediction 3") may make use of a third predictor $f_j^{y,3}( )$ in addition to first and second prediction operations (denoted as "Prediction 1" and "Prediction 2" respectively) using first and second predictors $f_j^{y,1}( )$ and $f_j^{y,2}( )$, respectively.

As previously noted, different types of cascade operations may be used in different operational scenarios by a codec as described herein. By way of illustration but not limitation, two different types of cascade operators may be used.

First, in some operational scenarios, an (arithmetic) addition operator may be used as cascade operations to combine predicted values from the three prediction operations of FIG. 1F, as follows:

$$f_j^y( )=f_j^{y,1}( )+f_j^{y,2}( )+f_j^{y,3}( ) \quad (15)$$

Second, in some operational scenarios, an (arithmetic) multiplication operator may be used as cascade operations to combine predicted values from the three prediction operations of FIG. 1F, as follows:

$$f_j^y( )=f_j^{y,1}( ) \cdot f_j^{y,2}( ) \cdot f_j^{y,3}( ) \quad (16)$$

With the addition of the third and new stage (as compared with the two-stage cascade prediction), some additional structure, information, etc., in the image data missed by other prediction operations in other stages may be captured. Later prediction operation(s)—which may be fully concurrently executed with earlier prediction operation(s) in a decoder as described herein—may be selected to be different or diverse from or more advanced than the earlier prediction operation(s). As new stages are added, subsequent residues to be predicted by subsequent prediction operations may become more like random noise, thereby providing less or more marginal benefits while increasing computational complexity as more and more new stages are added.

Derivation of Predictor Coefficients

A first predictor may be computed or represented with polynomials, MMR, TPB, etc. By way of illustration but not limitation, example computation of cascade prediction coefficients (or operational parameters) for a second predictor is described herein with respect to forward reshaping (from HDR to SDR).

For simplicity, denote a target signal for the second predictor as $s_{ji}$ and (first) predicted values from the first predictor $f_j^1( )$ as $\hat{s}_{ji}^1$. Thus, $$\hat{s}_{ji}^1 = f_j^1(v_{ji}^y, v_{ji}^{c0}, v_{ji}^{c1}) \quad (17)$$

The first predictor (or the first prediction operation) can be based on a single-channel polynomial or MMR with input in the form of a single input variable or multiple input variables. Prediction coefficients (constituting a first set of cascade prediction coefficients) may be obtained via an optimization process to minimize an error measure/cost such as one represented as mean-squared errors (MSE) as follows:

$$\text{(optimal) coeff of } f_j^1() = \arg\min \sum_{i=0}^{P-1} \|s_{ji} - \hat{s}_{ji}^1\|^2 \quad (18)$$

At the encoder side, a residual signal such as a difference between an original prediction target (or reference) signal and an output predicted signal from the first predictor denoted as $\Delta s_{ji}^2$ may be determined. Depending on a type of (e.g., reversible, etc.) cascade operator or cascade operation to be used in conjunction with the first and second predictors, different prediction target (or reference) values for the second predictor to predict in the second prediction operation may be determined.

In an example, the cascade operation is an arithmetic addition. Thus, the corresponding inverse cascade operation (or inverse cascade operator) is an (arithmetic) subtraction. The residual signal in a luma channel may be computed from the original prediction target signal and the first predicted signal with the inverse cascade operator, as follows:

$$\Delta_{ji}^{y,2} = s_{ji}^y - \hat{s}_{ji}^{y,1} \quad (19)$$

In another example, the cascade operation is an arithmetic multiplication. Thus, the corresponding inverse cascade operation (or inverse cascade operator) is an (arithmetic) division. The residual signal in a luma channel may be computed from the original prediction target signal and the first predicted signal with the inverse cascade operator, as follows:

$$\Delta s_{ji}^{y,2} = \frac{s_{ji}^y}{\hat{s}_{ji}^{y,1}} \quad (20)$$

The second predictor (or prediction operation) may be represented by a second prediction function as follows:

$$\Delta \hat{s}_{ji}^2 = f_j^2(v_{ji}^y, v_{ji}^{c0}, v_{ji}^{c1}) \qquad (21)$$

The second predictor (or prediction operation) aims to predict $\Delta s_{ji}^{y,2}$ using the original input value $(v_{ji}^y, v_{ji}^{c0}, v_{ji}^{c1})$. By way of example but not limitation, a type of the second prediction operator can be MMR, TPB, or another type with input in the form of multiple input variables. Prediction coefficients (constituting a second set of cascade prediction coefficients) for the second predictor may be obtained via an optimization process to minimize an error measure/cost such as one represented as mean-squared errors (MSE) as follows:

$$\text{(optimal) coeff of } f_j^2() = \arg\min \sum_{i=0}^{P-1} \|s_{ji}^2 - \hat{s}_{ji}^1\|^2 \qquad (22)$$

Take 3-channel MMR as an example, a design vector can be constructed as a vector of multivariate polynomial of input source (e.g., to be forward reshaped, etc.) signal, as follows:

$$v_{j,i} = [1\, v_{ji}^y\, v_{ji}^{c0}\, v_{ji}^{c1}\, v_{ji}^y \cdot v_{ji}^{c0}\, v_{ji}^y \cdot v_{ji}^{c1}\, v_{ji}^{c0} \cdot v_{ji}^{c1}\, v_{ji}^y \cdot v_{ji}^{c0} \cdot v_{ji}^{c1} \\ (v_{ji}^y)^2 (v_{ji}^{c0})^2 (v_{ji}^{c1})^2 (v_{ji}^y \cdot v_{ji}^{c0})^2 (v_{ji}^y \cdot v_{ji}^{c1})^2 (v_{ji}^{c0} \cdot v_{ji}^{c1})^2 \\ (v_{ji}^y \cdot v_{ji}^{c0} \cdot v_{ji}^{c1})^2] \qquad (23)$$

A design matrix comprising design vectors in expression (23) for all pixels (or SDR and HDR pixel pairs) may be constructed as follows:

$$V_j = \begin{bmatrix} v_{j,0} \\ v_{j,1} \\ \vdots \\ v_{j,P-1} \end{bmatrix} \qquad (24)$$

Y, Cb or C0, and Cr or C1 components of a reference (or prediction target) signal $\Delta s_{ji}^2$, comprising to-be-approximated values by values generated with the second predictor for Y, Cb and Cr channels for all pixels (or SDR and HDR pixel pairs) may be constructed as follows:

$$\Delta s_j^{y,2} = \begin{bmatrix} \Delta s_{j,0}^{y,2} & \Delta s_{j,1}^{y,2} & \cdots & \Delta s_{j,P-1}^{y,2} \end{bmatrix}^T \qquad (25\text{-}1)$$

$$\Delta s_j^{c0,2} = \begin{bmatrix} \Delta s_{j,0}^{c0,2} & \Delta s_{j,1}^{c0,2} & \cdots & \Delta s_{j,P-1}^{c0,2} \end{bmatrix}^T \qquad (25\text{-}2)$$

$$\Delta s_j^{c1,2} = \begin{bmatrix} \Delta s_{j,0}^{c1,2} & \Delta s_{j,1}^{c1,2} & \cdots & \Delta s_{j,P-1}^{c1,2} \end{bmatrix}^T \qquad (25\text{-}3)$$

The second predictor may be specified with MMR coefficients for the luma and chroma channels, as follows:

$$m_j^{y,2} = \begin{bmatrix} m_{j,0}^{y,2} & m_{j,1}^{y,2} & \cdots & m_{j,M-1}^{y,2} \end{bmatrix}^T \qquad (26\text{-}1)$$

$$m_j^{c0,2} = \begin{bmatrix} m_{j,0}^{c0,2} & m_{j,1}^{c0,2} & \cdots & m_{j,M-1}^{c0,2} \end{bmatrix}^T \qquad (26\text{-}2)$$

$$m_j^{c1,2} = \begin{bmatrix} m_{j,0}^{c1,2} & m_{j,1}^{c1,2} & \cdots & m_{j,M-1}^{c1,2} \end{bmatrix}^T \qquad (26\text{-}3)$$

where M is the total number of MMR coefficients, for example, 7*MMR_ORDER+1.

Predicted values to approximate each of the Y, Cb or C0, and Cr or C1 components of the reference (or prediction target) signal $\Delta s_{ji}^2$ in expressions (25) may be generated with the MMR coefficients, as follows:

$$\Delta \hat{s}_j^{y,2} = V_j m_j^{y,2} \qquad (27\text{-}1)$$

$$\Delta \hat{s}_j^{c0,2} = V_j m_j^{c0,2} \qquad (27\text{-}2)$$

$$\Delta \hat{s}_j^{c1,2} = V_j m_j^{c1,2} \qquad (27\text{-}3)$$

An optimization problem to minimize an overall approximation error for all pixels (or bins of pixels) for the purpose of deriving the MMR coefficients may be solved as follows:

$$\text{For channel } y: \min_{m_j^{y,2}} \|\Delta s_j^{y,2} - \Delta \hat{s}_j^{y,2}\|^2 \qquad (28\text{-}1)$$

$$\text{For channel } c0: \min_{m_j^{c0,2}} \|\Delta s_j^{c0,2} - \Delta \hat{s}_j^{c0,2}\|^2 \qquad (28\text{-}2)$$

$$\text{For channel } c1: \min_{m_j^{c1,2}} \|\Delta s_j^{c1,2} - \Delta \hat{s}_j^{c1,2}\|^2 \qquad (28\text{-}3)$$

This optimization problem can be solved with a linear least squared solution, as follows:

$$m_j^{y,2,opt} = \left((V_j)^T V_j\right)^{-1} \left((V_j)^T \Delta s_j^{y,2}\right) \qquad (29\text{-}1)$$

$$m_j^{c0,2,opt} = \left((V_j)^T V_j\right)^{-1} \left((V_j)^T \Delta s_j^{c0,2}\right) \qquad (29\text{-}2)$$

$$m_j^{c1,2,opt} = \left((V_j)^T V_j\right)^{-1} \left((V_j)^T \Delta s_j^{c1,2}\right) \qquad (29\text{-}3)$$

Figure 2A:
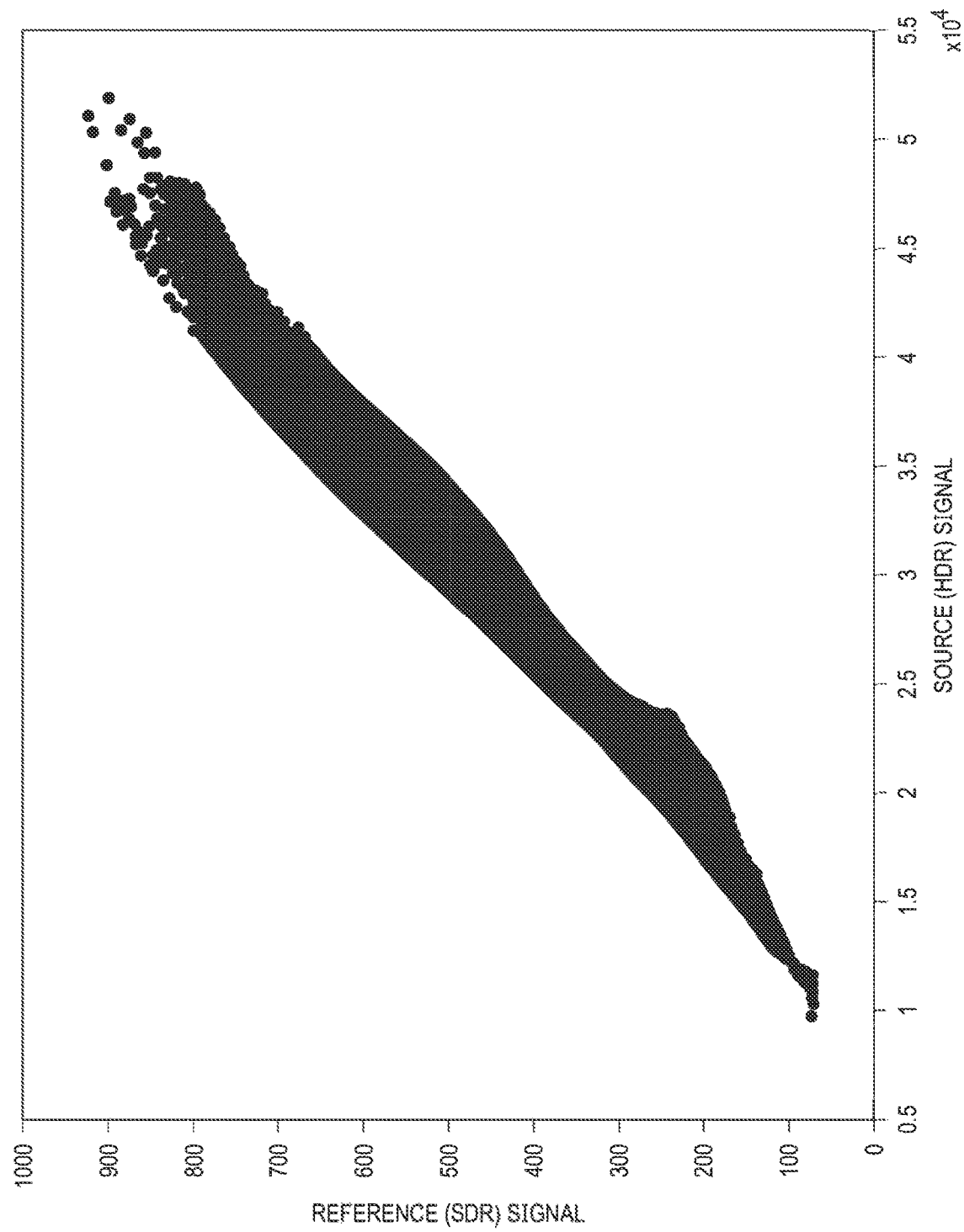

FIG. 2A illustrates an example scatterplot of luma (Y) codewords/values (as indicated with a vertical axis) in an SDR image versus corresponding luma (Y) codewords/values (as indicated with a horizontal axis) in a corresponding HDR image depicting the same visual sematic content as the SDR image.

Figure 2B:
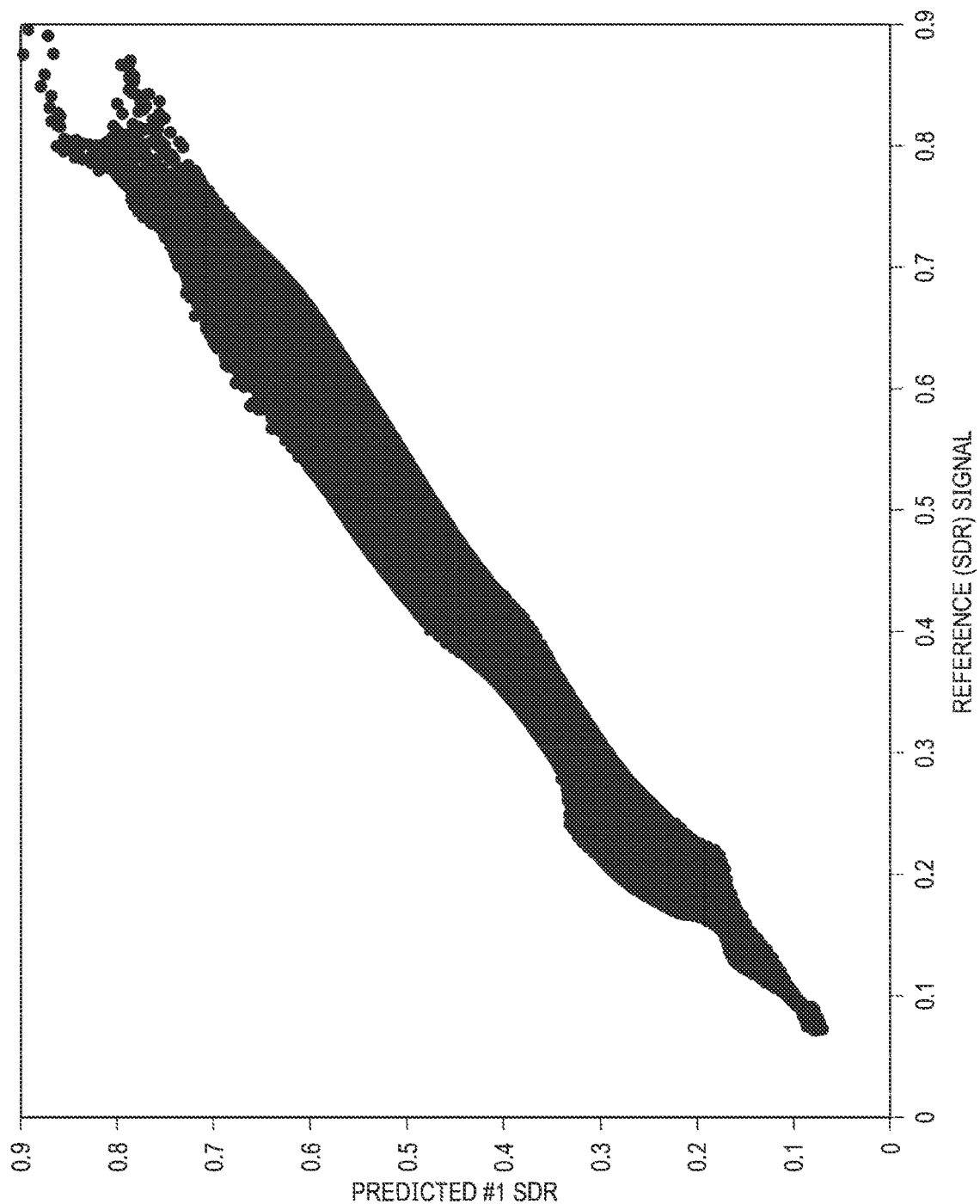

FIG. 2B illustrates an example scatterplot of predicted luma (Y) codewords/values (as indicated with a vertical axis)—as generated by a first predictor or prediction operation (denoted as "predictor #1") using the HDR image as input and using the SDR image as a prediction target/reference to be approximated by the predicted luma (Y) codewords/values—versus corresponding luma (Y) codewords/values (as indicated with a horizontal axis) in the SDR image.

FIG. 2C illustrates an example scatterplot of second-stage predicted values (as indicated with a vertical axis; denoted as "predicted signal #2)—as generated by a second predictor or prediction operation using the HDR image as input and using target/reference values generated by an inverse cascade operation and approximated by the second-stage predicted values versus the predicted luma (Y) codewords/values (as indicated with a horizontal axis) generated by the first predictor or prediction operation.

Figure 2D:
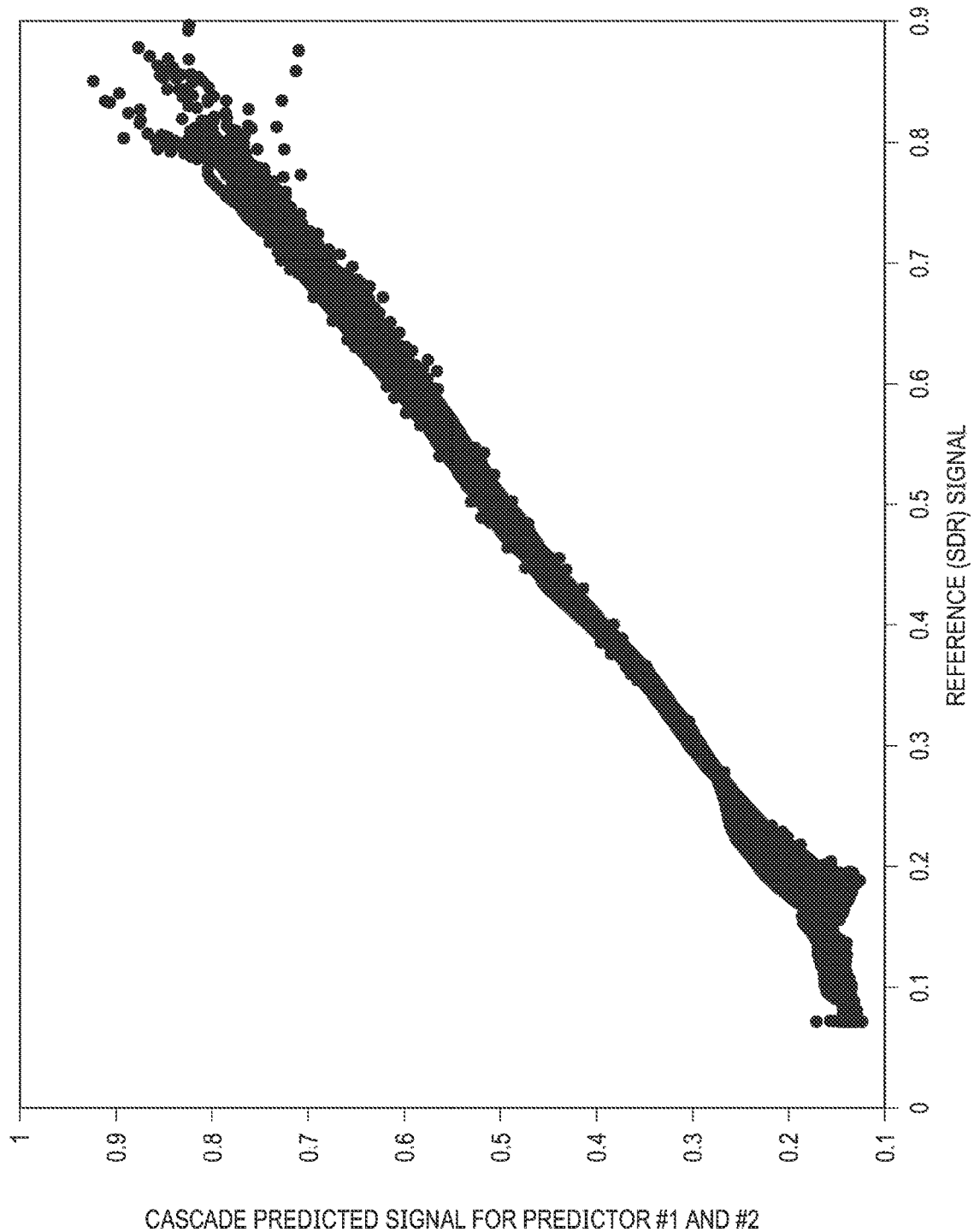

FIG. 2D illustrates an example scatterplot of overall predicted luma (Y) codewords/values (as indicated with a vertical axis)—as generated by combining the prediction values from the first and second predictors or prediction operations—versus corresponding luma (Y) codewords/values (as indicated with a horizontal axis) in the SDR image.

As compared with the scatter plot of FIG. 2B using only the first predictor or prediction operation, the overall predicted luma (Y) codewords/values generated by both the first and second predictors or prediction operations under cascade prediction as described herein show a relatively strong correlation with the luma (Y) codewords/values in the SDR image, thereby achieving a relatively high accuracy and quality level in a predicted image comprising the overall predicted luma (Y) codewords/values.

Application Architectures

Cascade prediction as described herein can be integrated into a wide variety of application architectures implemented with video codecs, including but not limited to those supporting single-layer backward compatible (SLBC) and single-layer inverse display management (SLiDM) video applications.

SLBC Architecture

Figure 3A:
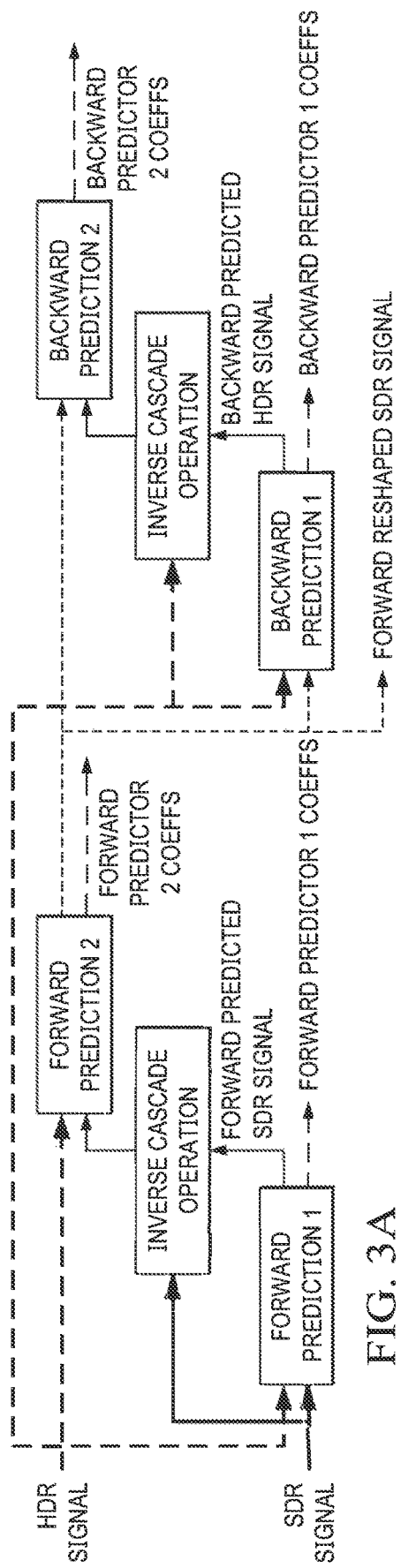
FIG. 3A illustrates an example single-layer backward compatible (SLBC) codec.

FIG. 3A illustrates an example SLBC codec (e.g., an SLBC video encoder, an SLBC video transcoder comprising a forward reshaping path and a backward reshaping path. Cascade prediction such as two-stage cascade predictions joined with an inverse cascade operation may be (e.g., additionally, optionally, or alternatively, etc.) performed in each of the forward and backward reshaping paths.

As shown, cascade prediction in the forward reshaping path comprises a first forward prediction operation (denoted as "forward prediction 1") and a second forward prediction operation (denoted as "forward prediction 2"). Cascade prediction in the backward reshaping path comprises a first backward prediction operation (denoted as "backward prediction 1") and a second backward prediction operation (denoted as "backward prediction 2").

It should be noted that the predictor or prediction operation in the forward reshaping path need not be symmetric or otherwise deterministic with respect to the predictor or prediction operation in the backward reshaping path. For example, the second forward prediction need not be the same as or conjugate to (e.g., inverse to, transposed from, etc.) the first backward prediction. Similarly, the first forward prediction need not be the same as or conjugate to (e.g., inverse to, transposed from, etc.) the second backward prediction.

Additionally, optionally or alternatively, different types of cascade predictions may be used in the two-stage prediction of each of the forwarding and backward reshaping paths. For example, for each of the forward and backward reshaping paths, a relatively simple predictor or prediction operation may be placed in the first stage, whereas a different, a relatively advanced predictor or prediction operations can be placed in the second stage after the simpler predictor or prediction operation to obtain additional prediction accuracy and performance gain.

More specifically, in some operational scenarios, the second forward predictor or prediction operation may be selected to be different or diverse from (or more advanced than) the first forward predictor or prediction operation. Similarly, the second backward predictor or prediction operation may be selected to be different or diverse from (or more advanced than) the first backward predictor or prediction operation.

In the forward reshaping path, luma and chroma HDR codewords/values constituting each HDR image in an input (or source) HDR signal (denoted as "HDR signal") may be forward reshaped into luma and chroma SDR codewords/values constituting a corresponding forward reshaped SDR image in a forward reshaped signal (denoted as "Forward Reshaped SDR signal"). The forward reshaped luma and chroma SDR codewords/values (e.g., closely, with various quality levels, etc.) approximate luma and chroma SDR codewords/values in a corresponding reference (or target) SDR image in a reference (or target) SDR signal (denoted as "SDR signal").

By way of example but not limitation, in the forward (reshaping) path, the first forward predictor or prediction operation comprises a first luma forward predictor (e.g., a function, a curve, a lookup table, a FLUT, etc.) constructed from CDF matching techniques, as follows:

$$\hat{s}_{ji}^{y,1} = f_j^{y,1}(v_{ji}^y) \tag{30}$$

where $\hat{s}_{ji}^{y,1}$ represents a first predicted luma codeword/value outputted by the first luma forward predictor.

A prediction error between the first predicted luma codeword/value and a target luma codeword/value $s_{ji}^y$ in the reference (or target) SDR signal to be approximated by the first predicted luma codeword/value may be generated using an inverse cascade operation (which may be luma specific, first-stage-specific, encoder-specific, etc.), as follows:

$$\Delta s_{ji}^{y,2} = s_{ji}^y - \hat{s}_{ji}^{y,1} \tag{31}$$

The prediction error may be used as prediction target values to be predicted or approximated using a second luma forward predictor such as an MMR mapping in the second forward predictor or prediction operation, as follows:

$$\Delta \hat{s}_{ji}^{y,2} = f_j^{y,2}(v_{ji}^y, v_{ji}^{c0}, v_{ji}^{c1}) \tag{32}$$

The final predicted value $\hat{s}_{ji}^y$ for the luma channel is generated by summing up predicted values outputted by both the and second luma forward predictors, as follows:

$$\hat{s}_{ji}^y = \hat{s}_{ji}^{y,1} + \Delta \hat{s}_{ji}^{y,2} \tag{33}$$

Similarly, in the forward (reshaping) path, for chroma channels Cb/C0 and Cr/C1, the first forward predictor or prediction operation comprises a first chroma forward predictor, as follows:

$$\hat{s}_{ji}^{c0,1} = f_j^{c0,1}(v_{ji}^y, v_{ji}^{c0}, v_{ji}^{c1}) \tag{34-1}$$

$$\hat{s}_{ji}^{c1,1} = f_j^{c1,1}(v_{ji}^y, v_{ji}^{c0}, v_{ji}^{c1}) \tag{34-2}$$

where $\hat{s}_{ji}^{0,1}$ and $\hat{s}_{ji}^{c1,1}$ denote first predicted chroma values for the chroma channels based on a single-stage MMR operation.

Prediction errors between the first predicted chroma codeword/value $\hat{s}_{ji}^{c0,1}$, $\hat{s}_{ji}^{c1,1}$ and target chroma codewords/values $s_{ji}^{c0}, s_{ji}^{c1}$ in the reference SDR signal to be approximated by the first predicted chroma codewords/values may be generated for each chroma channel using an inverse cascade operation (which may be luma specific, first-stage-specific, encoder-specific, etc.), as follows:

$$\Delta s_{ji}^{c0,2} = s_{ji}^{c0} - \hat{s}_{ji}^{c0,1} \tag{35-1}$$

$$\Delta s_{ji}^{c1,2} = s_{ji}^{c1} - \hat{s}_{ji}^{c1,1} \tag{35-2}$$

The prediction errors may be used as prediction target values to be predicted or approximated using a second chroma forward predictor such as a more advanced MMR mapping (than that used in the first chroma forward predictor in terms of type of the total number of stages used, the order or degree of constructs, mappings and functions used, operations, total number of input variables, type(s) of input variables, etc.) in the second forward predictor or prediction operation, as follows:

$$\Delta \hat{s}_{ji}^{c0,2} = f_j^{c0,2}(v_{ji}^y, v_{ji}^{c0}, v_{ji}^{c1}) \quad (36\text{-}1)$$

$$\Delta \hat{s}_{ji}^{c1,2} = f_j^{c1,2}(v_{ji}^y, v_{ji}^{c0}, v_{ji}^{c1}) \quad (36\text{-}2)$$

The final predicted values $\hat{s}_{ji}^{c0}$ and $\hat{s}_{ji}^{c1}$ for the chroma channels are generated by summing up predicted values outputted by both the and second chroma forward predictors, as follows:

$$\hat{s}_{ji}^{c0} = \hat{s}_{ji}^{c0,1} + \Delta \hat{s}_{ji}^{c0,2} \quad (37\text{-}1)$$

$$\hat{s}_{ji}^{c1} = \hat{s}_{ji}^{c1,1} + \Delta \hat{s}_{ji}^{c1,2} \quad (37\text{-}2)$$

In some operational scenarios, the final predicted values in expressions (33) and (37) may be outputted as forward reshaped luma and chroma codewords/values as a part of the forward reshaped SDR image/signal. The forward reshaped image/signal is encoded in a coded bitstream (e.g., 122 of FIG. 1A, etc.) and provided as input to the backward reshaping path.

In the backward reshaping path, the forward reshaped luma and chroma SDR codewords/values constituting each forward reshaped SDR image in the forward reshaped SDR signal may be backward reshaped into reconstructed luma and chroma HDR codewords/values constituting a corresponding reconstructed HDR image in a reconstructed HDR signal. The reconstructed or backward reshaped luma and chroma HDR codewords/values (e.g., closely, with various quality levels, etc.) approximate the luma and chroma HDR codewords/values in a corresponding input HDR image in the input HDR signal. Neither the input HDR signal nor the reconstructed HDR signal is encoded in the coded bitstream. Rather, image metadata (or composer metadata) specifying backward reshaping mappings such as multiple sets of cascade prediction operations are included in the coded bitstream. Instead of decoding HDR images from the coded bitstream, a recipient decoder or playback device decodes the forward reshaped SDR image and generates a reconstructed HDR image from the forward reshaped SDR image by applying the backward reshaping mappings to the forward reshaped SDR image.

By way of example but not limitation, in the backward (reshaping) path, the first backward predictor or prediction operation comprises a first luma backward predictor (e.g., a function, a curve, a lookup table, a BLUT, etc.) constructed from CDF matching techniques, as follows:

$$\hat{v}_{ji}^{y,1} = b_j^{y,1}(\hat{s}_{ji}^y) \quad (38)$$

where $\hat{v}_{ji}^{y,1}$ represents a first predicted luma codeword/value outputted by the first luma backward predictor.

A prediction error between the first predicted luma codeword/value and a target luma codeword/value $v_{ji}^y$ in the input HDR signal to be approximated by the first predicted luma codeword/value may be generated using an inverse cascade operation (which may be luma specific, first-stage-specific, encoder-specific, etc.), as follows:

$$\Delta v_{ji}^{y,2} = v_{ji}^y - \hat{v}_{ji}^{y,1} \quad (39)$$

The prediction error may be used as prediction target values to be predicted or approximated using a second luma backward predictor such as an MMR mapping in the second backward predictor or prediction operation, as follows:

$$\Delta \hat{v}_{ji}^{y,2} = b_j^{y,2}(\hat{s}_{ji}^y, \hat{s}_{ji}^{c0}, \hat{s}_{ji}^{c1}) \quad (40)$$

The final predicted value $\hat{v}_{ji}^y$ for the luma channel is generated by summing up predicted values outputted by both the first and second luma backward predictors, as follows:

$$\hat{v}_{ji}^y = \hat{v}_{ji}^{y,1} + \Delta \hat{v}_{ji}^{y,2} \quad (41)$$

Similarly, in the backward (reshaping) path, for chroma channels Cb/C0 and Cr/C1, the first backward predictor or prediction operation comprises a first chroma backward predictor, as follows:

$$\hat{v}_{ji}^{c0,1} = b_j^{c0,1}(\hat{s}_{ji}^y, \hat{s}_{ji}^{c0}, \hat{s}_{ji}^{c1}) \quad (42\text{-}1)$$

$$\hat{v}_{ji}^{c1,1} = b_j^{c1,1}(\hat{s}_{ji}^y, \hat{s}_{ji}^{c0}, \hat{s}_{ji}^{c1}) \quad (42\text{-}2)$$

where $\hat{v}_{ji}^{c1}$ and $\hat{v}_{ji}^{c1,1}$ denote first predicted chroma values for the chroma channels based on a single-stage MMR operation.

Prediction errors between the first predicted chroma codeword/value $\hat{v}_{ji}^{c0,1}$, $\hat{v}_{ji}^{c1,1}$ and target chroma codewords/values $v_{ji}^{c0}$, $v_{ji}^{c1}$ in the reference (or target) HDR signal to be approximated by the first predicted chroma codewords/values may be generated for each chroma channel using an inverse cascade operation (which may be luma specific, first-stage-specific, encoder-specific, etc.), as follows:

$$\Delta v_{ji}^{c0,2} = v_{ji}^{c0} - \hat{v}_{ji}^{c0,1} \quad (43\text{-}1)$$

$$\Delta v_{ji}^{c1,2} = v_{ji}^{c1} - \hat{v}_{ji}^{c1,1} \quad (43\text{-}2)$$

The prediction errors may be used as prediction target values to be predicted or approximated using a second chroma backward predictor such as a more advanced MMR mapping (than that used in the first chroma backward predictor in terms of type of the total number of stages used, the order or degree of constructs, mappings and functions used, operations, total number of input variables, type(s) of input variables, etc.) in the second backward predictor or prediction operation, as follows:

$$\Delta \hat{v}_{ji}^{c0,2} = b_j^{c0,2}(\hat{s}_{ji}^y, \hat{s}_{ji}^{c0}, \hat{s}_{ji}^{c1}) \quad (44\text{-}1)$$

$$\Delta \hat{v}_{ji}^{c1,2} = b_j^{c1,2}(\hat{s}_{ji}^y, \hat{s}_{ji}^{c0}, \hat{s}_{ji}^{c1}) \quad (44\text{-}2)$$

The final predicted values $\hat{v}_{ji}^{c0}$ and $\hat{v}_{ji}^{c1}$ for the chroma channels are generated by summing up predicted values outputted by both the and second chroma backward predictors, as follows:

$$\hat{v}_{ji}^{c0} = \hat{v}_{ji}^{c0,1} + \Delta \hat{v}_{ji}^{c0,2} \quad (45\text{-}1)$$

$$\hat{v}_{ji}^{c1} = \hat{v}_{ji}^{c1,1} + \Delta \hat{v}_{ji}^{c1,2} \quad (45\text{-}2)$$

It should be noted that the final predicted luma and chroma values $\hat{v}_{ji}^y$, $\hat{v}_{ji}^{c0}$ and $\hat{v}_{ji}^{c1}$ are to be generated by a recipient device that receives image metadata (or composer metadata) comprising multiple sets of cascade prediction coefficients. The multiple sets of cascade prediction coefficients comprise a first set specifying the first luma and chroma backward predictors $b_j^{y,1}(\ )$, $b_j^{c0,1}(\ )$, $b_j^{c0,2}(\ )$ and a second set specifying the second luma and chroma backward predictors $b_j^{y,2}()$, $b_j^{c1,1}()$, $b_j^{c1,2}()$. These backward predictors may be applied by the recipient device to a forward reshaped SDR image (comprising the forward reshaped SDR codewords/values $\{\hat{s}_{ji}^{y}, \hat{s}_{ji}^{c0}, \hat{s}_{ji}^{c1}\}$) decoded from the coded bitstream to generate the final predicted luma and chroma values $\hat{v}_{ji}^{y}$, $\hat{v}_{ji}^{c0}$ and $\hat{v}_{ji}^{c1}$ for the reconstructed HDR image.

SLiDM Architecture

Figure 3B:
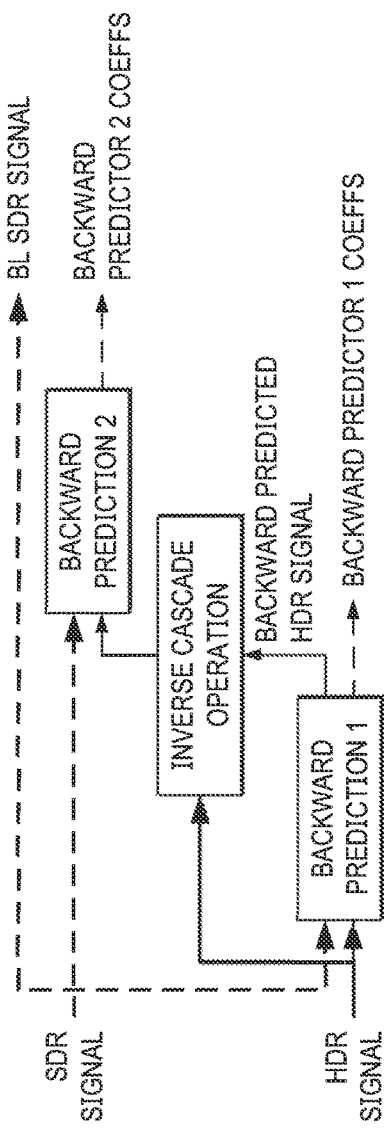
FIG. 3B illustrates an example single-layer inverse display management (SLiDM) codec.

FIG. 3B illustrates an example SLiDM codec (e.g., an SLiDM video encoder, an SLiDM video transcoder comprising a backward reshaping path. Cascade prediction such as two-stage cascade predictions joined with an inverse cascade operation may be (e.g., additionally, optionally, or alternatively, etc.) performed in the backward reshaping paths.

As shown, cascade prediction in the backward reshaping path comprises a first backward prediction operation (denoted as "backward prediction 1") and a second backward prediction operation (denoted as "backward prediction 2").

Different types of cascade predictions may be used in the two-stage prediction of the backward reshaping path. For example, a relatively simple predictor or prediction operation may be placed in the first stage, whereas a different, a relatively advanced predictor or prediction operations can be placed in the second stage after the simpler predictor or prediction operation to obtain additional prediction accuracy and performance gain.

In some operational scenarios, luma and chroma codewords/values of each SDR image in the input SDR signal are encoded in a coded bitstream (e.g., 122 of FIG. 1A, etc.) and provided as input to the backward reshaping path.

The luma and chroma SDR codewords/values constituting each input SDR image in the input SDR signal may be backward reshaped into reconstructed luma and chroma HDR codewords/values constituting a corresponding reconstructed HDR image in a reconstructed HDR signal. The reconstructed or backward reshaped luma and chroma HDR codewords/values (e.g., closely, with various quality levels, etc.) approximate the luma and chroma HDR codewords/values in a corresponding input HDR image in the input HDR signal. Neither the input HDR signal nor the reconstructed HDR signal is encoded in the coded bitstream. Rather, image metadata (or composer metadata) specifying backward reshaping mappings such as multiple sets of cascade prediction operations are included in the coded bitstream. Instead of decoding HDR images from the coded bitstream, a recipient decoder or playback device decodes the SDR image and generates a reconstructed HDR image from the SDR image by applying the backward reshaping mappings to the SDR image.

By way of example but not limitation, the first backward predictor or prediction operation comprises a first luma backward predictor (e.g., a function, a curve, a lookup table, a BLUT, etc.) constructed from CDF matching techniques, as follows:

$$\hat{v}_{ji}^{y,1} = b_j^{y,1}(s_{ji}^{y}) \tag{46}$$

where $\hat{v}_{ji}^{y,1}$ represents a first predicted luma codeword/value outputted by the first luma backward predictor.

A prediction error between the first predicted luma codeword/value and a target luma codeword/value $v_{ji}^{y}$ in the input HDR signal to be approximated by the first predicted luma codeword/value may be generated using an inverse cascade operation (which may be luma specific, first-stage-specific, encoder-specific, etc.), as follows:

$$\Delta v_{ji}^{y,2} = v_{ji}^{y} - \hat{v}_{ji}^{y,1} \tag{47}$$

The prediction error may be used as prediction target values to be predicted or approximated using a second luma backward predictor such as an MMR mapping in the second backward predictor or prediction operation, as follows:

$$\Delta \hat{v}_{ji}^{y,2} = b_j^{y,2}(s_{ji}^{y}, s_{ji}^{c0}, s_{ji}^{c1}) \tag{48}$$

The final predicted value $\hat{v}_{ji}^{y}$ for the luma channel can be generated by summing up predicted values outputted by both the and second luma backward predictors, as follows:

$$\hat{v}_{ji}^{y} = \hat{v}_{ji}^{y,1} + \Delta \hat{v}_{ji}^{y,2} \tag{49}$$

Similarly, in the backward (reshaping) path, for chroma channels Cb/C0 and Cr/C1, the first backward predictor or prediction operation comprises a first chroma backward predictor, as follows:

$$\hat{v}_{ji}^{c0,1} = b_j^{c0,1}(s_{ji}^{y}, s_{ji}^{c0}, s_{ji}^{c1}) \tag{50-1}$$

$$\hat{v}_{ji}^{c1,1} = b_j^{c1,1}(s_{ji}^{y}, s_{ji}^{c0}, s_{ji}^{c1}) \tag{50-2}$$

where $\hat{v}_{ji}^{c0,1}$ and $\hat{v}_{ji}^{c1,1}$ denote first predicted chroma values for the chroma channels based on a single-stage MMR operation.

Prediction errors between the first predicted chroma codeword/value $\hat{v}_{ji}^{c0,1}$, $\hat{v}_{ji}^{c1,1}$ and target chroma codewords/values $v_{ji}^{c0}$, $v_{ji}^{c1}$ in the reference (or target) HDR signal to be approximated by the first predicted chroma codewords/values may be generated for each chroma channel using an inverse cascade operation (which may be luma specific, first-stage-specific, encoder-specific, etc.), as follows:

$$\Delta v_{ji}^{c0,2} = v_{ji}^{c0} - \hat{v}_{ji}^{c0,1} \tag{51-1}$$

$$\Delta v_{ji}^{c1,2} = v_{ji}^{c1} - \hat{v}_{ji}^{c1,1} \tag{51-2}$$

The prediction errors may be used as prediction target values to be predicted or approximated using a second chroma backward predictor such as a more advanced MMR mapping (than that used in the first chroma backward predictor in terms of type of the total number of stages used, the order or degree of constructs, mappings and functions used, operations, total number of input variables, type(s) of input variables, etc.) in the second backward predictor or prediction operation, as follows:

$$\Delta \hat{v}_{ji}^{c0,2} = b_j^{c0,2}(s_{ji}^{y}, s_{ji}^{c0}, s_{ji}^{c1}) \tag{52-1}$$

$$\Delta \hat{v}_{ji}^{c1,2} = b_j^{c1,2}(s_{ji}^{y}, s_{ji}^{c0}, s_{ji}^{c1}) \tag{52-2}$$

The final predicted values $\hat{v}_{ji}^{c0}$ and $\hat{v}_{ji}^{c1}$ for the chroma channels can be generated by summing up predicted values outputted by both the and second chroma backward predictors, as follows:

$$\hat{v}_{ji}^{c0} = \hat{v}_{ji}^{c0,1} + \Delta \hat{v}_{ji}^{c0,2} \tag{53-1}$$

$$\hat{v}_{ji}^{c1} = \hat{v}_{ji}^{c1,1} + \Delta \hat{v}_{ji}^{c1,2} \tag{53-2}$$

It should be noted that the final predicted luma and chroma values $\hat{v}_{ji}^{y}$, $\hat{v}_{ji}^{c0}$ and $\hat{v}_{ji}^{c1}$ are to be generated by a recipient device that receives image metadata (or composer metadata) comprising multiple sets of cascade prediction coefficients. The multiple sets of cascade prediction coefficients comprise a first set specifying the first luma and chroma backward predictors $b_j^{y,1}()$, $b_j^{c0,1}()$, $b_j^{c0,2}()$ and a second set specifying the second luma and chroma backward predictors $b_j^{y,2}()$, $b_j^{c1,1}()$, $b_j^{c1,1}()$. These backward predictors may be applied by the recipient device to a decoded SDR image (comprising the SDR codewords/values $\{s_{ji}^{y}, s_{ji}^{c0}, s_{ji}^{c1}\}$) decoded from the coded bitstream to generate the final predicted luma and chroma values $\hat{v}_{ji}^{y}$, $\hat{v}_{ji}^{c0}$ and $\hat{v}_{ji}^{c1}$ for the reconstructed HDR image.

In some operational scenarios, linear segment-based structures may be used in computing/generating/including backward reshaping mappings in image metadata for the purpose of maintaining temporal stability of the image metadata. Example linear segment-based structures are described in U.S. Patent Application Publication Ser. No. 2018/0007356, published on Jan. 4, 2018, the entire contents of which are hereby incorporated by reference as if fully set forth herein.

Some or all techniques as described herein can be implemented and/or performed as parts of real time operation to produce suitable color grades of video content for broadcast video applications, real time streaming applications, etc. Additionally, optionally or alternatively, some or all techniques as described herein can be implemented and/or performed as parts of time-delay or offline operation to produce suitable color grades of video content for non-real time streaming applications, cinema applications, etc.

Example Process Flows

Figure 4A:
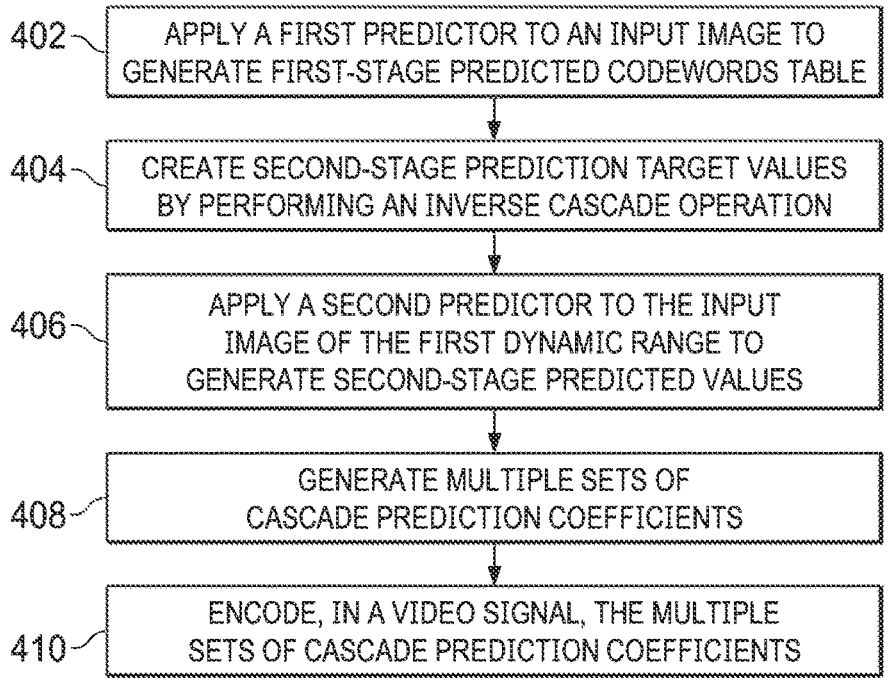
FIG. 4A and FIG. 4B illustrate example process flows.

FIG. 4A illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system applies a first predictor to an input image coded in a first domain to generate first-stage predicted codewords approximating prediction target codewords of a prediction target image coded in a second domain that is different from the first domain.

In block 404, the image processing system creates second-stage prediction target values by performing an inverse cascade operation on the prediction target codewords and the first-stage predicted codewords.

In block 406, the image processing system applies a second predictor to the input image in the first domain to generate second-stage predicted values approximating the second-stage prediction target values;

In block 408, the image processing system generates multiple sets of cascade prediction coefficients. The multiple sets of cascade prediction coefficients comprise a first set of cascade prediction coefficients specifying the first predictor. The multiple sets of cascade prediction coefficients comprise a second different set of cascade prediction coefficients specifying the second predictor.

In block 410, the image processing system encodes, in a video signal, the multiple sets of cascade prediction coefficients as image metadata. The video signal is further encoded with the input image in the first domain. A recipient device of the video signal uses the multiple sets of cascade prediction coefficients to apply the first predictor and the second predictor to the input image to generate a predicted image in the second domain. The predicted image in the second domain approximates the prediction target image in the second domain.

In an embodiment, the video signal represents one of: a single-layer backward compatible signal or a single-layer inverse display management signal; the second domain has one of: a higher dynamic range than, the same dynamic range as, or a lower dynamic range than, the first domain.

In an embodiment, the first predictor and the second predictor represent an overall backward reshaping mapping that maps the input image in the first domain to the predicted image in the second domain.

In an embodiment, the first predictor comprises a first luma predictor and a first chroma predictor; the second predictor comprises a second luma predictor and a second chroma predictor; the first and second luma predictors are different types of luma predictors, and wherein the first and second chroma predictors are different types of chroma predictors.

In an embodiment, the second luma predictor is more advanced than the first luma predictor.

In an embodiment, the first luma predictor represents a single-channel polynomial predictor; the second luma predictor represents a multi-channel multivariate multiple regression (MMR) predictor.

In an embodiment, the second chroma predictor is more advanced than the first chroma predictor.

In an embodiment, the first chroma predictor represents a multivariate multiple regression (MMR) predictor of a first order; the second chroma predictor represents an MMR predictor of a second order higher than the first order.

In an embodiment, the input image in the first domain is a forward reshaped image generated by applying a forward reshaping mapping to the prediction target image in the second domain.

In an embodiment, the forward reshaping mapping represents one of: a mapping not based on multi-stage cascade prediction, or a mapping based on multi-stage cascade prediction.

In an embodiment, the cascade prediction represents one of: an arithmetic addition operation, an arithmetic multiplication operation, a reversible arithmetic operation, a reversible functional operation, another reversible operation, and so forth.

Figure 4B:
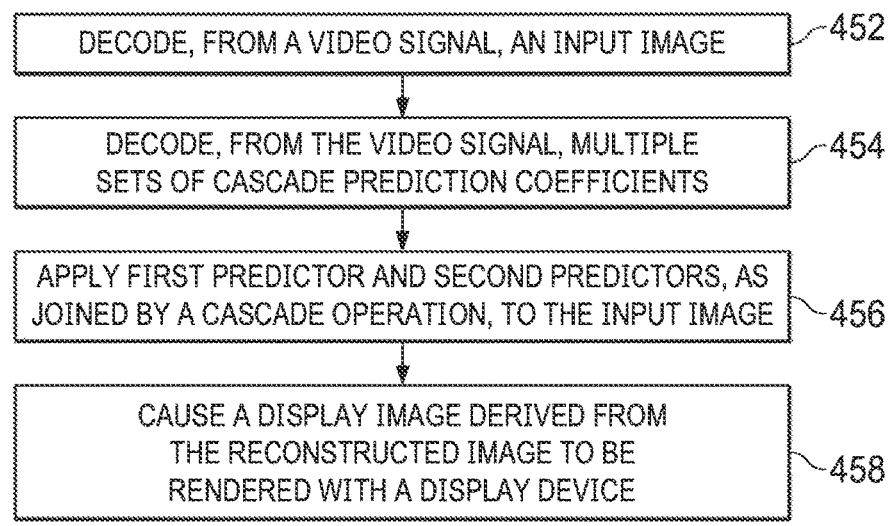

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, a video decoding system decodes, from a video signal, an input image coded in a first domain.

In block 454, the video decoding system decodes, from the video signal, image metadata comprising multiple sets of cascade prediction coefficients.

The multiple sets of cascade prediction coefficients were generated by an upstream image processing device.

The multiple sets of cascade prediction coefficients comprise a first set of cascade prediction coefficients, generated based at least in part on a prediction target image coded in a second domain, specifying a first predictor. The first domain is different from the second domain.

The multiple sets of cascade prediction coefficients comprise a second set of cascade prediction coefficients, generated based at least in part on the prediction target image in the second domain, specifying a second predictor.

In block 456, the video decoding system applies the first predictor and the second predictor, as joined by a cascade operation, to the input image in the first domain to generate a reconstructed image in the second domain. The reconstructed image in the second domain approximates the prediction target image in the second domain.

In block 458, the video decoding system causes a display image derived from the reconstructed image in the second domain to be rendered with a display device.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
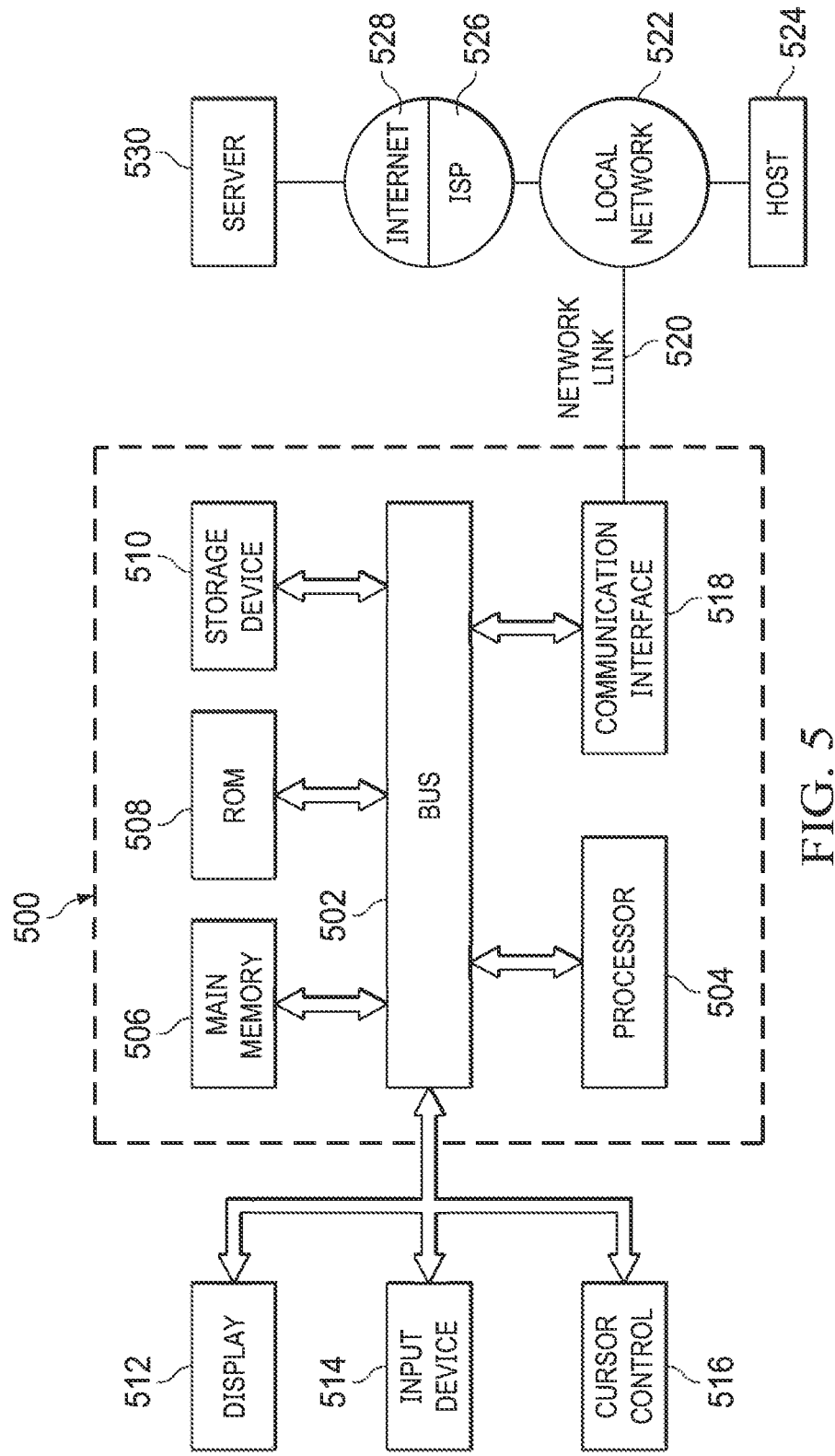
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
applying a first predictor to an input image coded in a first dynamic range domain to generate first-stage predicted codewords approximating prediction target codewords of a prediction target image coded in a second dynamic range domain that is different from the first dynamic range domain;
creating second-stage prediction target values by performing an inverse cascade operation on the prediction target codewords and the first-stage predicted codewords;
applying a second predictor to the input image in the first dynamic range domain to generate second-stage predicted values approximating the second-stage prediction target values;
generating multiple sets of cascade prediction coefficients based on the first-stage predicted codewords and the second-stage predicted values, wherein the multiple sets of cascade prediction coefficients comprise a first set of cascade prediction coefficients specifying the first predictor, wherein the multiple sets of cascade prediction coefficients comprise a second different set of cascade prediction coefficients specifying the second predictor; and encoding, in a video signal, the multiple sets of cascade prediction coefficients as image metadata, wherein the video signal is further encoded to include the input image coded in the first dynamic range domain, wherein a recipient device of the video signal is caused to use the multiple sets of cascade prediction coefficients to apply the first predictor and the second predictor to the input image to generate a predicted image in the second dynamic range domain, wherein the predicted image in the second dynamic range domain approximates the prediction target image in the second dynamic range domain, wherein the first predictor comprises a first luma predictor and a first chroma predictor, wherein the second predictor comprises a second luma predictor and a second chroma predictor, wherein the first and second luma predictors are different types of luma predictors, wherein the first and second chroma predictors are different types of chroma predictors, and wherein the first luma predictor represents a single-channel polynomial predictor, and wherein the second luma predictor represents a multi-channel multivariate multiple regression (MMR) predictor.

2. The method of claim 1, wherein the video signal represents one of: a single-layer backward compatible signal or a single-layer inverse display management signal; and wherein the second dynamic range domain has one of: a higher dynamic range than, or a lower dynamic range than, the first dynamic range domain.

3. The method of claim 1, wherein the first predictor and the second predictor represent an overall backward reshaping mapping that maps the input image in the first dynamic range domain to the predicted image in the second dynamic range domain.

4. The method of claim 1, wherein the second chroma predictor is more advanced than the first chroma predictor.

5. The method of claim 1, wherein the first chroma predictor represents a multivariate multiple regression (MMR) predictor of a second order, and wherein the second chroma predictor represents an MMR predictor of a third order higher than the first order.

6. The method of claim 1, wherein the input image in the first dynamic range domain is a forward reshaped image generated by applying a forward reshaping mapping to the prediction target image in the second dynamic range domain.

7. The method of claim 6, wherein the forward reshaping mapping represents one of: a mapping not based on multi-stage cascade prediction, or a mapping based on multi-stage cascade prediction.

8. The method of claim 1, wherein the cascade prediction represents one of: an arithmetic addition operation, an arithmetic multiplication operation, a reversible arithmetic operation, a reversible functional operation, or another reversible operation.

9. A method comprising:

decoding, from a video signal, an input image coded in a first dynamic range domain;

decoding, from the video signal, image metadata comprising multiple sets of cascade prediction coefficients;

wherein the multiple sets of cascade prediction coefficients were generated by an upstream image processing device;

wherein the multiple sets of cascade prediction coefficients comprise a first set of cascade prediction coefficients, generated based at least in part on a prediction target image coded in a second dynamic range domain, specifying a first predictor; wherein the first dynamic range domain is different from the second dynamic range domain;

wherein the multiple sets of cascade prediction coefficients comprise a second set of cascade prediction coefficients, generated based at least in part on the prediction target image in the second dynamic range domain, specifying a second predictor, wherein the first predictor comprises a first luma predictor and a first chroma predictor, wherein the second predictor comprises a second luma predictor and a second chroma predictor, wherein the first and second luma predictors are different types of luma predictors, wherein the first and second chroma predictors are different types of chroma predictors, and wherein the first luma predictor represents a single-channel polynomial predictor, and wherein the second luma predictor represents a multi-channel multivariate multiple regression (MMR) predictor;

applying the first predictor and the second predictor to the input image in the first dynamic range domain to generate a reconstructed image in the second dynamic range domain, wherein the reconstructed image in the second dynamic range domain approximates the prediction target image in the second dynamic range domain, wherein a cascade operation combines first-stage predicted codewords generated from applying the first predictor to the input image with second-stage predicted values generated from applying the second predictor to the input image; and causing a display image derived from the reconstructed image in the second dynamic range domain to be rendered with a display device.

10. The method of claim 9, wherein the first predictor and the second predictor represent an overall backward reshaping mapping that maps the input image in the first dynamic range domain to the reconstructed image in the second dynamic range domain.

11. The method of claim 9, wherein the display image is directly derived from a second reconstructed image coded in a third dynamic range domain, wherein the second reconstructed image in the third dynamic range domain approximates a second prediction target image in the third dynamic range domain; wherein the second reconstructed image in the third dynamic range domain is generated in part by using a second cascade operation to combine third-stage predicted values generated from applying a third predictor to the input image with reconstructed codewords in the reconstructed image in the second dynamic range domain.

12. An apparatus comprising a processor and configured to perform the method recited in claim 1.

13. A non-transitory computer-readable storage medium having stored thereon computer-executable instruction for executing a method with one or more processors in accordance with the method recited in claim 1.

* * * * *